United States Patent
Matsunaga et al.

(10) Patent No.: US 7,888,437 B2
(45) Date of Patent: Feb. 15, 2011

(54) PROCESS FOR PRODUCING OLEFIN POLYMER AND SOLID TITANIUM CATALYST COMPONENT

(75) Inventors: Kazuhisa Matsunaga, Otake (JP); Hisao Hashida, Iwakuni (JP); Toshiyuki Tsutsui, Otake (JP); Kunio Yamamoto, Kuga-gun (JP); Atsushi Shibahara, Chiba (JP); Tetsunori Shinozaki, Otake (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 577 days.

(21) Appl. No.: 11/795,505

(22) PCT Filed: Jan. 19, 2006

(86) PCT No.: PCT/JP2006/300774

§ 371 (c)(1),
(2), (4) Date: Mar. 12, 2008

(87) PCT Pub. No.: WO2006/077946

PCT Pub. Date: Jul. 27, 2006

(65) Prior Publication Data

US 2008/0306228 A1 Dec. 11, 2008

(30) Foreign Application Priority Data

Jan. 19, 2005 (JP) .............................. 2005-011512
Jan. 19, 2005 (JP) .............................. 2005-011513
Jan. 19, 2005 (JP) .............................. 2005-011514

(51) Int. Cl.
 C08F 4/42 (2006.01)
(52) U.S. Cl. ............... 526/124.3; 526/142; 526/124.2; 526/348; 502/103; 502/127; 502/132; 502/133
(58) Field of Classification Search ............... 526/142, 526/124.2, 124.3, 348; 502/103, 127, 132, 502/133
See application file for complete search history.

(56) References Cited

U.S. PATENT DOCUMENTS

| 4,725,656 | A | * | 2/1988 | Kashiwa et al. ......... 526/125.3 |
| 6,194,342 | B1 | | 2/2001 | Parodi et al. |
| 6,284,917 | B1 | | 9/2001 | Brunner et al. |
| 2004/0259721 | A1 | | 12/2004 | Matsunaga et al. |
| 2008/0097050 | A1 | | 4/2008 | Matsunaga et al. |
| 2008/0125555 | A1 | | 5/2008 | Matsunaga et al. |
| 2009/0069515 | A1 | | 3/2009 | Matsunaga et al. |

FOREIGN PATENT DOCUMENTS

| JP | 57-063310 A | | 4/1982 |
| JP | 03-007703 A | | 1/1991 |
| JP | 05-170843 A | | 7/1993 |
| JP | 06-122716 A | | 5/1994 |
| JP | 2001-114811 | * | 4/2001 |
| JP | 2001-114811 A | | 4/2001 |
| JP | 2003-040918 | * | 2/2003 |
| JP | 2003-040918 A | | 2/2003 |
| WO | WO 00/63261 A1 | | 10/2000 |
| WO | WO 01/57099 A1 | | 8/2001 |
| WO | WO 02/30998 A1 | | 4/2002 |

* cited by examiner

*Primary Examiner*—Ling-Siu Choi
(74) *Attorney, Agent, or Firm*—Buchanan Ingersoll & Rooney PC

(57) ABSTRACT

The process for producing an olefin polymer according to the present invention is characterized in that it comprises polymerizing an olefin having 3 or more carbon atoms in the presence of a catalyst for olefin polymerization containing a solid titanium catalyst component (I) which contains titanium, magnesium, halogen, and a cyclic ester compound (a) specified by the following formula (1):

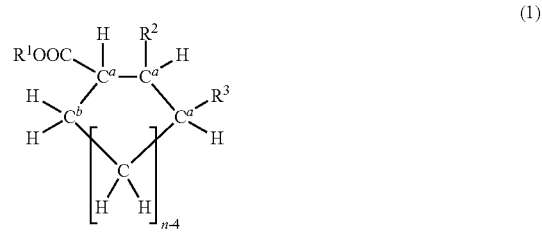

(1)

wherein n is an integer of 5 to 10,
$R^2$ and $R^3$ are each independently $COOR^1$ or a hydrogen atom, and at least one of $R^2$ and $R^3$ is $COOR^1$; and $R^1$'s are each independently a monovalent hydrocarbon group having 1 to 20 carbon atoms, and
a single bond (excluding $C^a$—$C^a$ bonds, and a $C^a$—$C^b$ bond in the case where $R^3$ is a hydrogen atom) in the cyclic backbone may be replaced with a double bond, and
an organometallic compound catalyst component (II),
at an internal pressure of the polymerization vessel which is 0.25 times or more as high as the saturation vapor pressure of the olefin at a polymerization temperature.

According to this process, an olefin polymer having a broad molecular weight distribution can be prepared.

8 Claims, 1 Drawing Sheet

PROCESS FOR PRODUCING OLEFIN POLYMER AND SOLID TITANIUM CATALYST COMPONENT

TECHNICAL FIELD

The present invention relates to a process for producing an olefin polymer having 3 or more carbon atoms, representatively exemplified by propylene, in particular to a production process which is suitable for the production of a polymer having a broad molecular weight distribution. Further, the invention relates to a solid titanium catalyst component which is suitable for the production of the olefin polymer.

BACKGROUND ART

As the catalysts for producing an olefin polymer such as a homopolymer of ethylene or an α-olefin, and a copolymer of ethylene/an α-olefin, the catalysts containing a titanium compound supported on magnesium halide in the active state have been conventionally known (hereinafter, the term "polymerization" may be described to encompass both of "homopolymerization" and "copolymerization").

As the catalyst for olefin polymerization, a catalyst containing titanium tetrachloride or titanium trichloride, which is called a Ziegler-Natta catalyst, a catalyst composed of a solid titanium catalyst component comprising magnesium, titanium, halogen and an electron donor, and an organometallic compound, and the like have been widely known.

The latter catalyst exhibits high activity in the polymerization of α-olefins such as propylene and butene-1, in addition to ethylene. Also, the obtained α-olefin polymer may have high stereoregularity.

It is reported that when among these catalysts, in particular, a catalyst comprising a solid titanium catalyst component having an electron donor, supported thereon, selected from carboxylic acid esters, typically exemplified by phthalic acid esters, and as a co-catalyst component, an aluminum-alkyl compound, and a silicon compound having at least one Si—OR (wherein R is a hydrocarbon group) is used, excellent polymerization activity and stereospecificity are exhibited in JP-A No. 57-63310 (Patent Document 1), etc.

The obtained polymers obtained by using the above-described catalyst often have narrower molecular weight distributions, as compared with the polymers obtained by using a Ziegler-Natta catalyst. It is known that the polymers having narrow molecular weight distributions tend to have "low melt flowability", "low melt tension", "poor moldability", "slightly low rigidity", or the like. On the other hand, from the standpoints of improvement of productivity, reduction in cost, or the like, various high speed molding technologies such as, for example, high speed stretching technologies aimed at improvement of productivity of the stretched film, have evolved.

When the polymers having relatively narrow molecular weight distributions as described above are to be stretched at a high speed, for example, the neck-in or flapping of the films may become more remarkable due to shortage of melt tension, and thus it becomes difficult to improve the productivity. Therefore, the polymers having higher melt tensions are demanded by the market.

In order to solve these problems, there have been many reports on a method for broadening the molecular weight distributions of the polymers by producing the polymers having different molecular weights by means of a multi-stage polymerization (JP-A No. 5-170843 (Patent Document 2)), a catalyst comprising plural kinds of electron donors (JP-A No. 3-7703 (Patent Document 3)), a catalyst using a succinic acid ester having an asymmetric carbon as the electron donor contained in the solid titanium catalyst component (pamphlet of International Publication WO 01/057099 (Patent Document 4), pamphlet of International Publication WO 00/63261 (Patent Document 5), pamphlet of International Publication WO 02/30998 (Patent Document 6)), and the like.

On the other hand, JP-A No. 2001-114811 (Patent Document 7) and JP-A No. 2003-40918 (Patent Document 8) disclose a solid catalyst component for olefin(s) polymerization, which is obtained by bringing into contact with a titanium compound, a magnesium compound and an electron-donating compound, and a catalyst for olefin(s) polymerization comprising the catalyst component. As the electron-donating compound, 1,2-cyclohexanedicarboxylic acid esters having a purity of the trans-isomers of 80% or more are used in the invention as described in Patent Document 7; and cyclohexenedicarboxylic acid diesters are used in the invention as described in Patent Document 8. As a specific example of these cyclohexenedicarboxylic acid diesters, 1-cyclohexenedicarboxylic acid diester only is disclosed, in which the alkoxycarbonyl group is bonded to the 1-position and the 2-position of the cyclohexene ring of 1-cyclohexene (paragraphs [0021] to [0024], and Examples). However, Patent Documents 7 and 8 have no description on the molecular weight distributions of the olefin polymers.

[Patent Document 1] JP-A No. 57-63310
[Patent Document 2] JP-A No. 5-170843
[Patent Document 3] JP-A No. 3-7703
[Patent Document 4] Pamphlet of International Publication WO 01/057099
[Patent Document 5] Pamphlet of International Publication WO 00/63261
[Patent Document 6] Pamphlet of International Publication WO 02/30998
[Patent Document 7] JP-A No. 2001-114811
[Patent Document 8] JP-A No. 2003-40918

DISCLOSURE OF THE INVENTION

However, the above-described catalysts have been the catalysts which have an insufficient effect of broadening the molecular weight distribution of the olefin polymer, and according to the investigation conducted by the present inventors, broaden the molecular weight distribution by increasing the content of the low molecular weight components. Thus, it cannot be said that the catalysts sufficiently improved the melt tension of the olefin polymer, as evaluated from the market, and further the markets point out such the problem that the costs required for producing the catalysts are high. On the other hand, from the viewpoint of reduction in the cost, appearance of a catalyst or a process for producing an olefin polymer which makes it possible to produce an olefin polymer having a molecular weight distribution broadened by means of a simpler process is desired by the market.

Therefore, it is an object of the present invention to provide a process for producing an olefin polymer which is capable of conveniently producing an olefin polymer having a broad molecular weight distribution and a high melt tension, and being suitable for high speed stretch and high speed molding.

Further, it is another object of the invention to provide a catalyst component which is capable of conveniently producing an olefin polymer having a broad molecular weight distribution and a high melt tension, and being suitable for high speed stretch and high speed molding.

The present inventors have made extensive studies, and as a result, they found that polymerization is carried out by using a solid titanium catalyst component comprising a specific cyclic hydrocarbon compound having a plurality of carboxylic acid ester groups, controlling the internal pressure of the polymerization vessel to a specific pressure, and preferably under the conditions of high monomer concentration which are exemplified by bulk polymerization, an olefin polymer having a broad molecular weight distribution can be prepared. Thus, they completed the invention relating to a process for producing an olefin polymer. In addition, Patent Documents 7 and 8 have neither description nor disclosure on the effect of the polymerization process on the molecular weight distribution of the olefin polymer.

The process for producing an olefin polymer of the invention is characterized in that it comprises polymerizing an olefin having 3 or more carbon atoms in the presence of a catalyst for olefin polymerization comprising a solid titanium catalyst component (I) which comprises titanium, magnesium, halogen, and a cyclic ester compound (a) specified by the following formula (1):

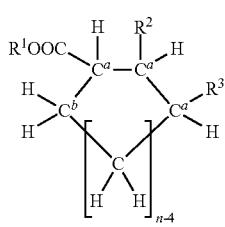

(1)

wherein n is an integer of 5 to 10, $R^2$ and $R^3$ are each independently $COOR^1$ or a hydrogen atom, and at least one of $R^2$ and $R^3$ is $COOR^1$; and $R^1$'s are each independently a monovalent hydrocarbon group having 1 to 20 carbon atoms, and a single bond (excluding $C^a$—$C^a$ bonds, and a $C^a$—$C^b$ bond in the case where $R^3$ is a hydrogen atom) in the cyclic backbone may be replaced with a double bond, and an organometallic compound catalyst component (II) which comprises a metal element selected from Groups I, II and XIII of the periodic table, at an internal pressure of the polymerization vessel which is 0.25 times or more as high as the saturation vapor pressure of the olefin at a polymerization temperature.

As the olefin having 3 or more carbon atoms, an α-olefin having 3 to 6 carbon atoms is preferred, and propylene, 1-butene and 4-methyl-1-pentene are particularly preferred.

The Mw/Mn value as determined by GPC measurement of the olefin polymer is preferably 6 or more.

The present inventors have made extensive studies, and as a result, they found that when a solid titanium catalyst component comprising a specific cyclic ester compound having a plurality of carboxylic acid ester groups is used, the effect of obtaining an olefin polymer having a broad molecular weight distribution can be highly compatibilized with the polymerization activity and the stereoregularity of the obtained polymer. Thus, they completed the invention relating to a catalyst component. In addition, Patent Documents 7 and 8 have no description on a cyclic ester compound (a-1) represented by the following formula (2).

The solid titanium catalyst component (I-1) of the invention is characterized in that it comprises titanium, magnesium, halogen, and the cyclic ester compound (a-1) specified by the following formula (2):

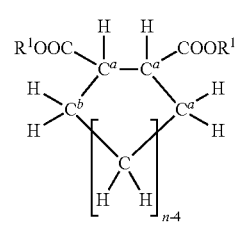

(2)

wherein n is an integer of 5 to 10;

a single bond (excluding $C^a$—$C^a$ bonds and a $C^a$—$C^b$ bond) in the cyclic backbone may be replaced with a double bond; and $R^1$'s are each independently a monovalent hydrocarbon group having 1 to 20 carbon atoms.

Furthermore, the purity of the trans-isomers of the compound represented by the above formula (2) is 51 to 79%.

It is preferable that the bonds between the carbon atoms of the cyclic backbone of the cyclic ester compound (a-1) are all single bonds.

It is preferable that the cyclic backbone of the cyclic ester compound (a-1) has 6 carbon atoms.

The process for producing an olefin polymer of the invention is suitable for producing an olefin polymer having a broad molecular weight distribution.

Further, when the process for producing an olefin polymer of the invention is used, it can be expected that an olefin polymer, for example, having excellent rigidity, as well as the molding properties such as high speed stretchability and high speed moldability can be prepared.

Further, when the solid titanium catalyst component (I-1) of the invention is used, an olefin polymer having a broad molecular weight distribution and high stereoregularity can be produced with high activity.

When the solid titanium catalyst component (I-1) of the invention is used, it can be expected that an olefin polymer, for example, having excellent rigidity, as well as the molding properties such as high speed stretchability and high speed moldability can be prepared.

DESCRIPTION OF THE PREFERRED EMBODIMENTS

Figure 1:
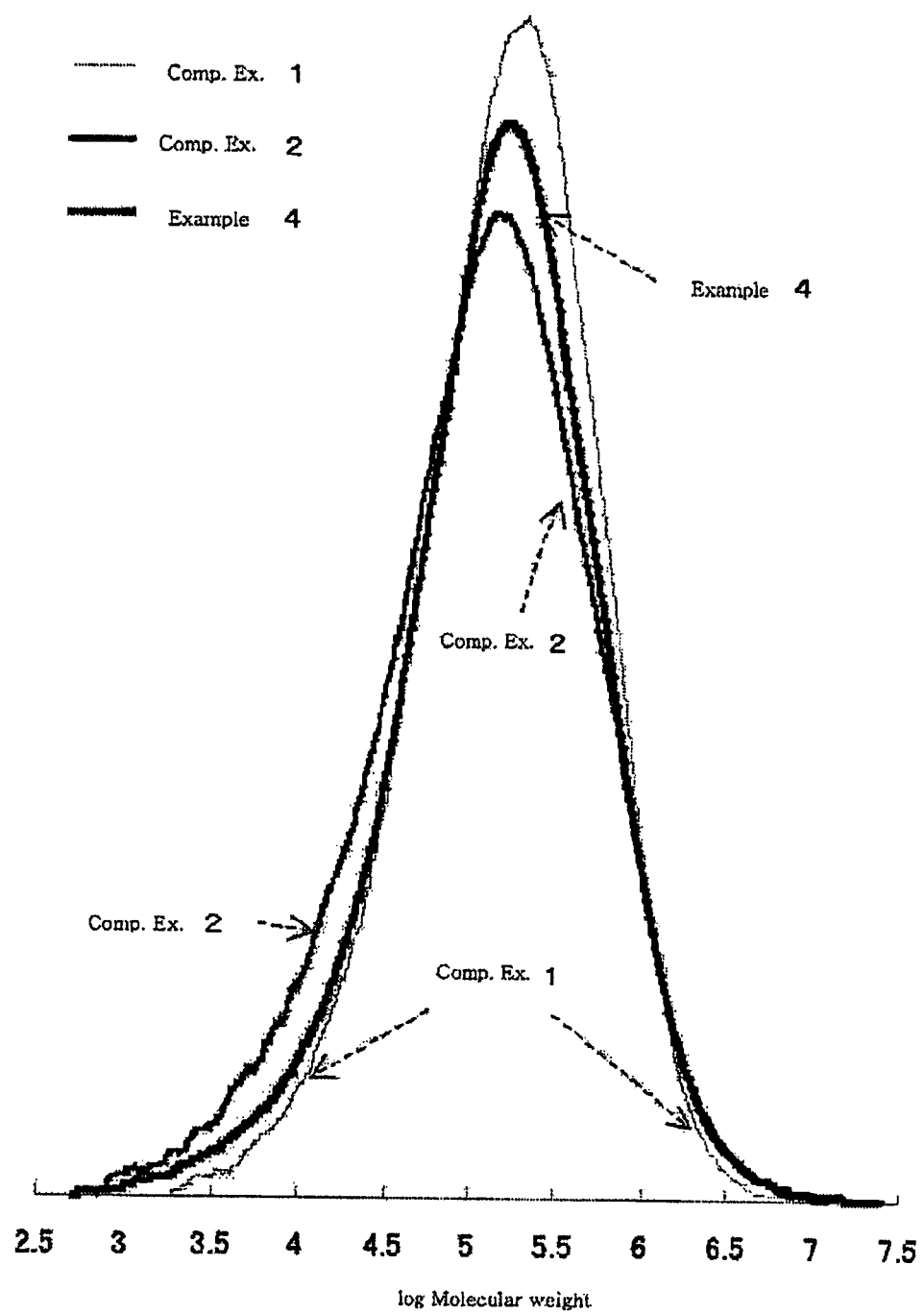
FIG. 1 is a GPC chromatogram of the polypropylene obtained in Example 4, Comparative Example 1 and Comparative Example 2.

Hereinbelow, the process for producing an olefin polymer and the solid titanium catalyst component (I-1) according to the invention will be described in detail.

[Process for Producing Olefin Polymer]

The process for producing an olefin polymer according to the invention is characterized in that it comprises polymerizing an olefin having 3 or more carbon atoms in the presence of a catalyst for olefin polymerization comprising a solid titanium catalyst component (I) as described below, and an organometallic compound catalyst component (II) which comprises a metal element selected from Groups I, II and XIII of the periodic table, at an internal pressure of the polymerization vessel which is 0.25 times or more as high as the saturation vapor pressure of the olefin at a polymerization temperature.

According to the invention, even with a single-stage polymerization, an olefin polymer having a broad molecular weight distribution can be obtained, and thus even with a process in which a multi-stage polymerization, that is, a polymerization process including changing the condition during the polymerization, cannot be realized, an olefin polymer having a broad molecular weight distribution can be obtained.

First, each of the catalyst components will be described.

[Solid Titanium Catalyst Component (I)]

The solid titanium catalyst component (I) according to the invention is characterized in that it comprises titanium, magnesium, halogen, and the cyclic ester compound (a).

<Cyclic Ester Compound (a)>

The above-described cyclic ester compound (a) comprises a plurality of carboxylic acid ester groups, and is represented by the following formula (1):

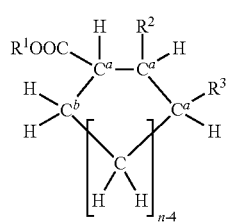

(1)

In the formula (1), n is an integer of 5 to 10, preferably an integer of 5 to 7, and particularly preferably 6. Further, $C^a$ and $C^b$ represent carbon atoms.

It is preferable that the bonds between the carbon atoms are all single bonds in the cyclic backbone, but any of single bonds excluding $C^a$—$C^a$ bonds, and a $C^a$—$C^b$ bond in the case where $R^3$ is a hydrogen atom, in the cyclic backbone may be replaced with double bonds.

$R^2$ and $R^3$ are each independently $COOR^1$ or a hydrogen atom, and at least one of $R^2$ and $R^3$ is $COOR^1$, and $R^1$'s are each independently a monovalent hydrocarbon group having 1 to 20 carbon atoms.

A plurality of $R^1$'s are each independently a monovalent hydrocarbon group having 1 to 20 carbon atoms, preferably 1 to 10 carbon atoms, more preferably 2 to 8 carbon atoms, even more preferably 4 to 8 carbon atoms, and particularly preferably 4 to 6 carbon atoms. Examples of these hydrocarbon groups include an ethyl group, an n-propyl group, an isopropyl group, an n-butyl group, an isobutyl group, a hexyl group, a heptyl group, an octyl group, a 2-ethylhexyl group, a decyl group, a dodecyl group, a tetradecyl group, a hexadecyl group, an octadecyl group, an eicosyl group, and the like; and among them, preferred are an n-butyl group, an isobutyl group, a hexyl group and an octyl group, and more preferred are an n-butyl group and an isobutyl group.

Examples of the cyclic ester compound (a) include
diethyl cyclohexane-1,2-dicarboxylate,
di-n-propyl cyclohexane-1,2-dicarboxylate,
diisopropyl cyclohexane-1,2-dicarboxylate,
di-n-butyl cyclohexane-1,2-dicarboxylate,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
di-2-ethylhexyl cyclohexane-1,2-dicarboxylate,
didecyl cyclohexane-1,2-dicarboxylate,
diethyl cyclohexane-1,3-dicarboxylate,
diisobutyl cyclohexane-1,3-dicarboxylate,
diethyl cyclopentane-1,2-dicarboxylate,
diisopropyl cyclopentane-1,2-dicarboxylate,
diisobutyl cyclopentane-1,2-dicarboxylate,
diheptyl cyclopentane-1,2-dicarboxylate,
didecyl cyclopentane-1,2-dicarboxylate,
diethyl cyclopentane-1,3-dicarboxylate,
diisobutyl cyclopentane-1,3-dicarboxylate,
diethyl cycloheptane-1,2-dicarboxylate,
diisopropyl cycloheptane-1,2-dicarboxylate,
diisobutyl cycloheptane-1,2-dicarboxylate,
diheptyl cycloheptane-1,2-dicarboxylate,
didecyl cycloheptane-1,2-dicarboxylate,
diethyl cycloheptane-1,3-dicarboxylate,
diisobutyl cycloheptane-1,3-dicarboxylate,
diethyl cyclooctane-1,2-dicarboxylate,
diethyl cyclodecane-1,2-dicarboxylate,
diethyl 4-cyclohexene-1,2-dicarboxylate,
di-n-propyl 4-cyclohexene-1,2-dicarboxylate,
diisopropyl 4-cyclohexene-1,2-dicarboxylate,
di-n-butyl 4-cyclohexene-1,2-dicarboxylate,
diisobutyl 4-cyclohexene-1,2-dicarboxylate,
dihexyl 4-cyclohexene-1,2-dicarboxylate,
diheptyl 4-cyclohexene-1,2-dicarboxylate,
dioctyl 4-cyclohexene-1,2-dicarboxylate,
didecyl 4-cyclohexene-1,2-dicarboxylate,
diethyl 4-cyclohexene-1,3-dicarboxylate,
diisobutyl 4-cyclohexene-1,3-dicarboxylate,
diethyl 3-cyclopentene-1,2-dicarboxylate,
diisopropyl 3-cyclopentene-1,2-dicarboxylate,
diisobutyl 3-cyclopentene-1,2-dicarboxylate,
diheptyl 3-cyclopentene-1,2-dicarboxylate,
didecyl 3-cyclopentene-1,2-dicarboxylate,
diethyl 3-cyclopentene-1,3-dicarboxylate,
diisobutyl 3-cyclopentene-1,3-dicarboxylate,
diethyl 4-cycloheptene-1,2-dicarboxylate,
diisopropyl 4-cycloheptene-1,2-dicarboxylate,
diisobutyl 4-cycloheptene-1,2-dicarboxylate,
diheptyl 4-cycloheptene-1,2-dicarboxylate,
didecyl 4-cycloheptene-1,2-dicarboxylate,
diethyl 4-cycloheptene-1,3-dicarboxylate,
diisobutyl 4-cycloheptene-1,3-dicarboxylate,
diethyl 5-cyclooctene-1,2-dicarboxylate,
diethyl 6-cyclodecene-1,2-dicarboxylate,
and the like.

The compounds having the diester structure as described above may exist in the form of a cis-isomer or a trans-isomer, either of which has effects which are consistent with the purpose of the invention.

For the diester structure as described above, the purity of the trans-isomers (ratio of trans-isomers in the trans-isomers and cis-isomers) is preferably 51 to 79%. The purity of the trans-isomers is more preferably 55 to 79%, even more preferably 60 to 79%, and particularly preferably 65 to 79%.

Particularly the purity of the trans-isomers of the cyclohexane-1,2-dicarboxylic acid diester in which n=6 in the formula (1) falls within the above range.

When the purity of the trans-isomers is less than 51%, the effect of broadening the molecular weight distribution may be insufficient, and the activity or stereospecificity may be insufficient. When the purity of the trans-isomers is more than 79%, the effect of broadening the molecular weight distribution may be insufficient. That is, when the purity of the trans-isomers is within the above-described range, the effect of broadening the molecular weight distribution of the obtained polymer can be highly compatibilized with the activity of the catalyst and the high stereoregularity of the obtained polymer.

As the above-described cyclic ester compound (a), a compound having a cycloalkane-1,2-dicarboxylic acid diester structure is preferred, and di-n-butyl cyclohexane-1,2-dicarboxylate,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
di-2-ethylhexyl cyclohexane-1,2-dicarboxylate,
diisobutyl cyclopentane-1,2-dicarboxylate,
diheptyl cyclopentane-1,2-dicarboxylate,
diisobutyl cycloheptane-1,2-dicarboxylate,
diheptyl cycloheptane-1,2-dicarboxylate, and the like are particularly preferred.

Among these compounds,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
di-2-ethylhexyl cyclohexane-1,2-dicarboxylate, and the like are more preferred.

The reason for this is that these compounds have high catalytic performances, and can be prepared using a Diels Alder reaction at a relatively low cost.

By the process for producing an olefin polymer of the invention, a polymer having a broad molecular weight distribution can be obtained. The reason for this is unclear at present, but is assumed to be as follows.

It is known that the cyclic hydrocarbon structures form a variety of steric structures such as a chair conformation and a boat conformation. These various steric structures which can be taken lead to the formation of various active species on the solid titanium catalyst component (I). In particular, if the bond between a carbon atom bonded with an ester group (COOR$^1$ group) and another carbon atom bonded with an ester group (COOR$^1$ group) among the carbon atoms constituting the cyclic backbone of the cyclic ester compound (a) is a single bond, variation of the steric structure which can be taken increases. As a result, when the olefin polymerization is carried out by using the solid titanium catalyst component (I), the olefin polymers having various molecular weights can be prepared at one time, that is, the olefin polymers having broad molecular weight distributions can be prepared.

These compounds may be used alone or in combination of two or more kinds thereof. Further, these cyclic ester compounds (a) may be used in combination with a catalyst component (b) as described below, as long as it does not give any adverse effect on the purpose of the invention.

Further, the cyclic ester compound (a) may be formed during the process of producing the solid titanium catalyst component (I). For example, when the solid titanium catalyst component (I) is produced, the cyclic ester compound (a) can be contained in the solid titanium catalyst component by involving a process of substantially bringing an anhydrous carboxylic acid or carboxylic acid dihalide corresponding to the cyclic ester compound (a), and a corresponding alcohol into contact with each other.

For the production of the solid titanium catalyst component (I) used in the invention, a magnesium compound and a titanium compound are used, in addition to the cyclic ester compound (a).

<Magnesium Compound>

Specific examples of the magnesium compound include well-known magnesium compounds including
magnesium halides such as magnesium chloride and magnesium bromide;
alkoxymagnesium halides such as methoxymagnesium chloride, ethoxymagnesium chloride and phenoxymagnesium chloride;
alkoxymagnesium such as ethoxymagnesium, isopropoxymagnesium, butoxymagnesium and 2-ethylhexoxymagnesium;
aryloxymagnesiums such as phenoxymagnesium;
magnesium carboxylates such as magnesium stearate;
and the like.

These magnesium compounds may be used alone or in combination of two or more kinds thereof. Further, these magnesium compounds may be in the form of a complex compound or a composite compound with other metals, or in the form of a mixture with other metal compounds.

Among these, halogen-containing magnesium compounds are preferred, and magnesium halide, in particular magnesium chloride is more preferably used. In addition, alkoxymagnesium such as ethoxymagnesium is also preferably used. Further, the magnesium compounds may be those derived from other materials, for example, those obtained by bringing an organomagnesium compound such as a Grignard reagent, and titanium halide, silicon halide, alcohol halide, and the like into contact with each other.

<Titanium Compound>

Examples of the titanium compound include a tetravalent titanium compound represented by the following formula:

$$Ti(OR)_g X_{4-g}$$

(wherein R is a hydrocarbon group, X is a halogen atom, and g satisfies the condition $0 \leqq g \leqq 4$). More specifically, examples thereof include
titanium tetrahalides such as $TiCl_4$ and $TiBr_4$;
alkoxytitanium trihalides such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{-}iso\text{-}C_4H_9)Br_3$;
alkoxytitanium dihalides such as $Ti(OCH_3)_2Cl_2$ and $Ti(OC_2H_5)_2Cl_2$,
alkoxytitanium monohalides such as $Ti(OCH_3)_3Cl$, $Ti(O\text{-}n\text{-}C_4H_9)_3Cl$ and $Ti(OC_2H_5)_3Br$;
tetraalkoxytitaniums such as $Ti(OCH_3)_4$, $Ti(OC_2H_5)_4$, $Ti(O\text{-}n\text{-}C_4H_9)_4$ and $Ti(O\text{-}2\text{-ethylhexyl})_4$;
and the like.

Among these, preferred are titanium tetrahalides, and particularly preferred is titanium tetrachloride. These titanium compounds can be used alone or in combination of two or more kinds thereof.

Examples of the magnesium compounds and the titanium compounds include those as described in detail in the above-described Patent Document 1, Patent Document 2, or the like.

For the production of the solid titanium catalyst component (I) used in the invention, a well-known method can be employed without limit except that the cyclic ester compound (a) is used. Specific preferable examples of the process include the following processes (P-1) to (P-4).

(P-1) Process of bringing a solid adduct comprising of a magnesium compound and a catalyst component (b) described below, a cyclic ester compound (a) and a liquid-state titanium compound into contact with each other in a suspended state in the coexistence of an inert hydrocarbon solvent.

(P-2) Process of bringing a solid adduct comprising of a magnesium compound and a catalyst component (b), a cyclic ester compound (a) and a liquid-state titanium compound into contact with each other in plural steps.

(P-3) Process of bringing a solid adduct comprising of a magnesium compound and a catalyst component (b), a cyclic ester compound (a) and a liquid-state titanium compound into contact with each other in a suspended state in the coexistence of an inert hydrocarbon solvent, and in plural steps.

(P-4) Process of bringing a liquid-state magnesium compound comprising of a magnesium compound and a catalyst component (b), a liquid-state titanium compound and a cyclic ester compound (a) into contact with each other.

The reaction temperature for the production of the solid titanium catalyst component (I) is in the range of preferably −30° C. to 150° C., more preferably −25° C. to 130° C., even more preferably −25° C. to 120° C., and in particular, −25° C. to 110° C., preferably −25° C. to 105° C.

Further, the production of the solid titanium catalyst component can be carried out, if necessary, in the presence of a well-known medium. Examples of the medium include the compounds of aromatic hydrocarbons such as toluene having some polarity, well-known aliphatic hydrocarbons or alicyclic hydrocarbons such as heptane, octane, decane and cyclohexane, and among these, aliphatic hydrocarbons are preferably exemplified.

When the olefin polymerization reaction is carried out by using the solid titanium catalyst component (I) prepared within the above-described range, the effect of obtaining a polymer having a broad molecular weight distribution can be highly compatibilized with activity of the catalyst and high stereoregularity of the obtained polymer.

(Catalyst Component (b))

For the catalyst component (b) used for the formation of the above-described solid adduct or liquid-state magnesium compound, preferred are well-known compounds which can solubilize the magnesium compound in the temperature range of room temperature to around 300° C., and preferred are, for example, alcohols, aldehydes, amines, carboxylic acids and a mixture thereof. Examples of these compounds include those as described in detail in the above-described Patent Document 1 or Patent Document 2.

More specific examples of alcohols having ability to solubilize the magnesium compound include aliphatic alcohols such as methanol, ethanol, propanol, butanol, isobutanol, ethylene glycol, 2-methylpentanol, 2-ethylbutanol, n-heptanol, n-octanol, 2-ethylhexanol, decanol and dodecanol;

alicyclic alcohols such as cyclohexanol and methylcyclohexanol;

aromatic alcohols such as benzyl alcohol and methylbenzyl alcohol;

aliphatic alcohols having an alkoxy group such as n-butyl cellosolve;

and the like.

Examples of the carboxylic acids include organic carboxylic acids having at least 7 carbon atoms, such as caprylic acid and 2-ethylhexanoic acid. Examples of the aldehydes include aldehydes having at least 7 carbon atoms, such as capric aldehyde and 2-ethylhexyl aldehyde.

Examples of the amines include amines having at least 6 carbon atoms, such as heptylamine, octylamine, nonylamine, laurylamine and 2-ethylhexylamine.

As the catalyst component (b), preferred are the above-described alcohols, and particularly preferred are ethanol, propanol, butanol, isobutanol, hexanol, 2-ethylhexanol, decanol and the like.

The amounts of the magnesium compound and the catalyst component (b) to be used in the production of the solid adduct or liquid-state magnesium compound vary depending on the kinds thereof, the contact conditions, or the like, but the magnesium compound is used in an amount of 0.1 to 20 mol/liter, and preferably 0.5 to 5 mol/liter per unit volume of the catalyst component (b). Further, if desired, a medium which is inert to the solid adduct can be used in combination.

Examples of this medium include the compounds of aromatic hydrocarbons such as toluene having some polarity, and well-known aliphatic hydrocarbons or alicyclic hydrocarbons such as heptane, octane, decane and cyclohexane, and among these, aliphatic hydrocarbons are preferably exemplified.

The compositional ratio of magnesium of the obtained solid adduct or liquid-state magnesium compound to the catalyst component (b) varies depending on the kinds of the compound to be used, and thus it cannot be generally defined. But the amount of the catalyst component (b) is in the range of preferably 2.6 moles or more, and more preferably 2.7 moles or more and 5 moles or less, based on 1 mole of magnesium in the magnesium compound.

<Aromatic Carboxylic Acid Ester and/or Compound Having Two or More Ether Linkages Through a Plurality of Carbon Atoms>

The solid titanium catalyst component (I) used in the invention may further comprise an aromatic carboxylic acid ester and/or a compound having two or more ether linkages through a plurality of carbon atoms (hereinafter, also referred to as the "catalyst component (c)"). When the solid titanium catalyst component (I) used in the invention contains the catalyst component (c), activity and stereoregularity may be increased or the molecular weight distribution may be further broadened.

As this catalyst component (c), well-known aromatic carboxylic acid esters or polyether compounds, which are preferably used for the conventionally used catalysts for olefin polymerization, for example, those as described in the above-described Patent Document 2, JP-A No. 2001-354714, or the like can be used without limit.

Specific examples of this aromatic carboxylic acid ester include aromatic polyvalent carboxylic acid esters such as phthalic acid ester, in addition to aromatic carboxylic acid monoesters such as benzoic acid ester and toluic acid ester. Among these, preferred are aromatic polyvalent carboxylic acid esters, and more preferred are phthalic acid esters. As these phthalic acid esters, preferred are phthalic acid alkyl esters such as ethyl phthalate, n-butyl phthalate, isobutyl phthalate, hexyl phthalate and heptyl phthalate, and particularly preferred is isobutyl phthalate.

Further, more specific examples of the polyether compounds include the compounds represented by the following formula (3):

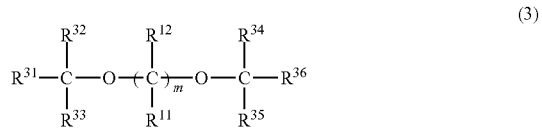

(3)

$$R^{31}-\underset{\underset{R^{33}}{|}}{\overset{\overset{R^{32}}{|}}{C}}-O-(\underset{\underset{R^{11}}{|}}{\overset{\overset{R^{12}}{|}}{C}})_m-O-\underset{\underset{R^{35}}{|}}{\overset{\overset{R^{34}}{|}}{C}}-R^{36}$$

Further, in the above formula (3), m is an integer satisfying the condition $1 \leq m \leq 10$, and preferably an integer satisfying the condition $3 \leq m \leq 10$, and $R^{11}$ to $R^{36}$ are each independently a hydrogen atom or substituents having at least one kind of element selected from carbon, hydrogen, oxygen, fluorine, chlorine, bromine, iodine, nitrogen, sulfur, phosphorus, boron and silicon.

When m is 2 or more, a plurality of $R^{11}$ and $R^{12}$ may be the same or different from each other. Any of $R^{11}$ to $R^{36}$, and preferably $R^{11}$ and $R^{12}$ may be bonded to each other to form a ring other than a benzene ring.

Specific examples of some of these compounds include monosubstituted dialkoxypropanes such as
2-isopropyl-1,3-dimethoxypropane,
2-s-butyl-1,3-dimethoxypropane and
2-cumyl-1,3-dimethoxypropane;

disubstituted dialkoxypropanes such as
2-isopropyl-2-isobutyl-1,3-dimethoxypropane,
2,2-dicyclohexyl-1,3-dimethoxypropane,
2-methyl-2-isopropyl-1,3-dimethoxypropane,
2-methyl-2-cyclohexyl-1,3-dimethoxypropane,
2-methyl-2-isobutyl-1,3-dimethoxypropane,
2,2-diisobutyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2,2-di-s-butyl-1,3-dimethoxypropane,
2,2-dineopentyl-1,3-dimethoxypropane,
2-isopropyl-2-isopentyl-1,3-dimethoxypropane and
2-cyclohexyl-2-cyclohexylmethyl-1,3-dimethoxypropane;

dialkoxyalkanes such as 2,3-dicyclohexyl-1,4-diethoxybutane,
2,3-dicyclohexyl-1,4-diethoxybutane,
2,3-diisopropyl-1,4-diethoxybutane,
2,4-diphenyl-1,5-dimethoxypentane,
2,5-diphenyl-1,5-dimethoxyhexane,
2,4-diisopropyl-1,5-dimethoxypentane,
2,4-diisobutyl-1,5-dimethoxypentane and
2,4-diisoamyl-1,5-dimethoxypentane;

trialkoxyalkanes such as
2-methyl-2-methoxymethyl-1,3-dimethoxypropane,
2-cyclohexyl-2-ethoxymethyl-1,3-diethoxypropane and
2-cyclohexyl-2-methoxymethyl-1,3-dimethoxypropane;

dialkoxycycloalkanes such as
2,2-diisobutyl-1,3-dimethoxy-4-cyclohexene,
2-isopropyl-2-isoamyl-1,3-dimethoxy-4-cyclohexene,
2-cyclohexyl-2-methoxymethyl-1,3-dimethoxy-4-cyclohexene,
2-isopropyl-2-methoxymethyl-1,3-dimethoxy-4-cyclohexene,
2-isobutyl-2-methoxymethyl-1,3-dimethoxy-4-cyclohexene,
2-cyclohexyl-2-ethoxymethyl-1,3-dimethoxy-4-cyclohexene,
2-isopropyl-2-ethoxymethyl-1,3-dimethoxy-4-cyclohexene and
2-isobutyl-2-ethoxymethyl-1,3-dimethoxy-4-cyclohexene;

and the like.

Among these, preferred are 1,3-diethers, and particularly preferred are
2-isopropyl-2-isobutyl-1,3-dimethoxypropane,
2,2-diisobutyl-1,3-dimethoxypropane,
2-isopropyl-2-isopentyl-1,3-dimethoxypropane,
2,2-dicyclohexyl-1,3-dimethoxypropane and
2,2-bis(cyclohexylmethyl)-1,3-dimethoxypropane.

These compounds may be used alone or in combination of two or more kinds thereof.

The cyclic ester compound (a), the catalyst component (b) and the catalyst component (c) as described above may well be thought to belong to the components which are referred to as electron donors by a skilled person in the art. It is known that the electron donor components have the effect of enhancing stereoregularity of the obtained polymer, the effect of controlling the composition distribution of the obtained copolymer and the effect as an aggregator of controlling the particle shape and particle size of the catalyst particle, while maintaining high activity of the catalyst.

It is thought that the cyclic ester compound (a) also exhibits the effect of controlling the molecular weight distribution because it itself is an electron donor.

For the solid titanium catalyst (I) used in the invention, the halogen/titanium (atomic ratio) (i.e., number of moles of the halogen atoms/number of moles of the titanium atoms) is preferably 2 to 100, and more preferably 4 to 90;

the cyclic ester compound (a)/titanium (molar ratio) (i.e., number of moles of the cyclic ester compound (a))/number of moles of the titanium atoms) is preferably 0.01 to 100, and more preferably 0.2 to 10; and as for the catalyst component (b) and the catalyst component (c), the catalyst component (b)/the titanium atom (molar ratio) is preferably 0 to 100, and more preferably 0 to 10, and the catalyst component (c)/the titanium atom (molar ratio) is preferably 0 to 100, and more preferably 0 to 10.

The magnesium/titanium (atomic ratio) (i.e., number of moles of the magnesium atoms/number of moles of the titanium atoms) is preferably 2 to 100, and more preferably 4 to 50.

The contents of the components which may be contained in addition to the cyclic ester compound (a), for example, the catalyst component (b) and the catalyst component (c) are 20% by weight or less, and preferably 10% by weight or less, based on 100% by weight of the cyclic ester compound (a).

As the more specific production conditions of the solid titanium catalyst component (I), the conditions as described in, for example, EP 585869 A1 (European patent application publication No. 0585869), the above-described Patent Document 2, or the like can be preferably employed, except that the cyclic ester compound (a) is used.

[Catalyst for Olefin Polymerization]

The catalyst for olefin polymerization, which is used in the process for producing an olefin polymer according to the invention, is characterized in that it comprises the solid titanium catalyst component (I) according to the invention and an organometallic compound catalyst component (II) containing a metal element selected from Groups I, II and XIII of the periodic table.

<Organometallic Compound Catalyst Component (II)>

For the organometallic compound catalyst component (II), a compound containing a metal in Group XIII, for example, an organoaluminum compound and a complex alkylate of a metal in Group I and aluminum, an organometallic compound of a metal in Group II, or the like can be used. Among these, preferred is the organoaluminum compound.

Specific preferable examples of the organometallic compound catalyst component (II) include the organometallic compound as described in well-known documents, for example, the above-described EP 585869 A1.

<Catalyst Component (III)>

The catalyst for olefin polymerization used in the invention may comprise the above-described catalyst component (III), if necessary, together with the organometallic compound catalyst component (II). Preferable examples of the catalyst component (III) include organosilicon compounds. Examples of these organosilicon compounds include the compound represented by the following general formula:

$R_n Si(OR')_{4-n}$ wherein R and R' are hydrocarbon groups, and n is an integer satisfying the condition 0<n<4.

As the organosilicon compounds represented by the above formula, specifically diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane, cyclopentyldimethylethoxysilane, or the like is used.

Among these, vinyltriethoxysilane, diphenyldimethoxysilane, dicyclohexyldimethoxysilane, cyclohexylmethyldimethoxysilane or dicyclopentyldimethoxysilane is preferably used.

Also, preferable examples of the above-described organosilicon compounds further include the silane compounds represented by the following formula (5) as described in the pamphlet of International Publication WO 2004/016662.

$$\mathrm{Si}(\mathrm{OR}^a)_3(\mathrm{NR}^b\mathrm{R}^c) \qquad (5)$$

In the formula (5), $R^a$ is a hydrocarbon group having 1 to 6 carbon atoms, and examples of $R^a$ include an unsaturated or saturated aliphatic hydrocarbon group having 1 to 6 carbon atoms, or the like, and particularly preferably a hydrocarbon group having 2 to 6 carbon atoms. Specific examples thereof include a methyl group, an ethyl group, an n-propyl group, an isopropyl group, an n-butyl group, an isobutyl group, a sec-butyl group, an n-pentyl group, an isopentyl group, a cyclopentyl group, an n-hexyl group, a cyclohexyl group, or the like, among which an ethyl group is particularly preferable.

In the formula (5), $R^b$ is a hydrocarbon group having 1 to 12 carbon atoms or a hydrogen atom, and examples of $R^b$ include an unsaturated or saturated aliphatic hydrocarbon group having 1 to 12 carbon atoms, a hydrogen atom, and the like. Specific examples thereof include a hydrogen atom, a methyl group, an ethyl group, an n-propyl group, an isopropyl group, an n-butyl group, an isobutyl group, a sec-butyl group, an n-pentyl group, an isopentyl group, a cyclopentyl group, an n-hexyl group, a cyclohexyl group, an octyl group, and the like, among which an ethyl group is particularly preferable.

In the formula (5), $R^c$ is a hydrocarbon group having 1 to 12 carbon atoms, and examples of $R^c$ include an unsaturated or saturated aliphatic hydrocarbon group having 1 to 12 carbon atoms, a hydrogen atom, and the like. Specific examples thereof include a methyl group, an ethyl group, an n-propyl group, an isopropyl group, an n-butyl group, an isobutyl group, a sec-butyl group, an n-pentyl group, an isopentyl group, a cyclopentyl group, an n-hexyl group, a cyclohexyl group, an octyl group, and the like, among which an ethyl group is particularly preferable.

Specific examples of the compound represented by the formula (5) include
dimethylaminotriethoxysilane,
diethylaminotriethoxysilane,
diethylaminotrimethoxysilane,
diethylaminotriethoxysilane,
diethylaminotri-n-propoxysilane,
di-n-propylaminotriethoxysilane,
methyl-n-propylaminotriethoxysilane,
t-butylaminotriethoxysilane,
ethyl-n-propylaminotriethoxysilane,
ethyl-isopropylaminotriethoxysilane and
methylethylaminotriethoxysilane.

Further, other examples of the above-described organosilicon compounds include the compound represented by the following formula (6):

$$\mathrm{RNSi}(\mathrm{OR}^a)_3 \qquad (6)$$

In the formula (6), RN is a cyclic amino group, and examples of the cyclic amino group include a perhydroquinolino group, a perhydroisoquinolino group, a 1,2,3,4-tetrahydroquinolino group, a 1,2,3,4-tetrahydroisoquinolino group, an octamethyleneimino group, and the like. Specific examples of the compound represented by the above formula (6) include (perhydroquinolino)triethoxysilane, (perhydroisoquinolino)triethoxysilane, (1,2,3,4-tetrahydroquinolino)triethoxysilane, (1,2,3,4-tetrahydroisoquinolino)triethoxysilane, octamethyleneiminotriethoxysilane, and the like.

These organosilicon compounds may be used in combination of two or more kinds thereof.

Further, other preferable examples of the compounds which are useful as the catalyst component (III) include polyether compounds which are exemplified as the aromatic carboxylic acid ester and/or the compound having two or more ether linkages through a plurality of carbon atoms (the catalyst component (c)).

Among these polyether compounds, preferred are 1,3-diethers, and particularly preferred is 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane.

These compounds may be used alone or in combination of two or more kinds thereof.

If these catalyst components (III) are used, the polymerization activity and the stereoregularity of the obtained olefin polymer may be further improved.

Further, the catalyst for olefin polymerization used in the invention may comprise other components useful for olefin polymerization, if necessary, in addition to each of the above-described components. Examples of such other components include a support such as silica, an antistatic agent, a particle coagulant, a preservation stabilizing agent, and the like.

[Process for Producing Olefin Polymer]

The process for producing an olefin polymer according to the invention is characterized in that it comprises polymerizing an olefin having 3 or more carbon atoms in the presence of the catalyst for olefin polymerization, at an internal pressure of the polymerization vessel which is 0.25 times or more as high as the vapor pressure of the olefin at a polymerization temperature.

Furthermore, according to the invention, the reason why the internal pressure of the polymerization vessel affects the molecular weight distribution is unclear, but is assumed that since in the case where the internal pressure of the polymerization vessel is low, that is, the concentration of olefin relative to the catalyst is low, the rate at which the side reactions such as a chain transfer reaction is increased, as compared with that of the polymerization reaction, then the effect of the polymerization reaction for broadening the molecular weight distribution, which the solid titanium catalyst component (1) essentially has, is relatively decreased.

When the internal pressure of the polymerization vessel is lower than the above-described range, the molecular weight distribution may be approximately equivalent to those of the conventional ones.

The lower limit of the internal pressure (absolute pressure) of the polymerization vessel is preferably is 0.3 times, and more preferably 0.4 times as much as the vapor pressure of the olefin as above. It is difficult that the preferable upper limit of the internal pressure of the polymerization vessel is defined as the ratio of the saturation vapor pressure to the polymerization temperature of the olefin. The reason for this is that, when it is 1 time or more as much as the vapor pressure, the olefin is liquefied, that is, the concentration of the olefin for the catalyst is not varied at an internal pressure of the polymerization vessel which is 1 time or more as much as the saturation vapor pressure.

In addition, the internal pressure of the polymerization vessel generally tends to be described using a gauge pressure, but usually the absolute pressure may be considered to be a value obtained by adding 0.1 MPa as a normal pressure to the gauge pressure.

The upper limit of the internal pressure of the polymerization vessel is preferably 10 MPa (gauge pressure), more preferably 8 MPa (gauge pressure), even more preferably 6 MPa (gauge pressure), particularly preferably 5 MPa (gauge pressure), and further particularly preferably 4 MPa (gauge pressure).

When the internal pressure of the polymerization vessel is high, the construction cost for the process becomes high, and thus there may be a problem that the cost for producing an olefin polymer is increased.

In the invention, the term "polymerization" may encompass copolymerization such as random copolymerization and block copolymerization, as well as homopolymerization.

For the process for producing an olefin polymer of the invention, it is also possible that polymerization is carried out in the presence of a prepolymerization catalyst obtained by prepolymerization of an α-olefin in the presence of the catalyst for olefin polymerization as described above. This prepolymerization is carried out by prepolymerization of an α-olefin in an amount of 0.1 to 1000 g, preferably 0.3 to 500 g, and particularly preferably 1 to 200 g, based on 1 g of the catalyst for olefin polymerization.

The concentration of the catalyst in the prepolymerization system may be higher than that in the polymerization system.

In the prepolymerization, the concentration of the solid titanium catalyst component (I) is in the range of preferably about 0.001 to 200 mmol, more preferably about 0.01 to 50 mmol, and particularly preferably 0.1 to 20 mmol, in terms of titanium atom, based on 1 liter of the liquid medium.

In the prepolymerization, the amount of the organometallic compound catalyst component (II) may be such that 0.1 to 1,000 g, and preferably 0.3 to 500 g of the polymer is produced, based on 1 g of the solid titanium catalyst component (I), and the amount is preferably about 0.1 to 300 mol, more preferably about 0.5 to 100 mol, and particularly preferably 1 to 50 mol, based on 1 mol of the titanium atom in the solid titanium catalyst component (I).

In the prepolymerization, the catalyst component (III) may be used, if necessary, and these components are used in an amount of 0.1 to 50 mol, preferably 0.5 to 30 mol, and particularly preferably 1 to 10 mol, based on 1 mol of the titanium atom in the solid titanium catalyst component (I).

The prepolymerization can be carried out under the mild condition by adding an olefin and the above-described catalyst components to an inert hydrocarbon medium.

In this case, specific examples of the inert hydrocarbon medium to be used include aliphatic hydrocarbons such as propane, butane, pentane, hexane, heptane, octane, decane, dodecane and kerosene;

alicyclic hydrocarbons such as cycloheptane, cycloheptane, methylcycloheptane, 4-cycloheptane, 4-cycloheptane and methyl-4-cycloheptane;

aromatic hydrocarbons such as benzene, toluene and xylene;

halogenated hydrocarbons such as ethylene chloride and chlorobenzene;

and a mixture thereof.

Among these inert hydrocarbon media, aliphatic hydrocarbons are particularly preferably used. As such, when the inert hydrocarbon medium is used, it is preferable that the prepolymerization is carried out batchwise.

On the other hand, the prepolymerization may be carried out by using olefin itself a solvent, and substantially without a solvent. In this case, it is preferable that the prepolymerization is carried out continuously.

The olefins used in the prepolymerization may be the same or different from those used in the polymerization as described below, and specifically, it is preferably propylene.

The temperature for prepolymerization is in the range of preferably about −20 to +100° C., more preferably about −20 to +80° C., and even more preferably 0 to +40° C.

Next, the polymerization after the afore-mentioned prepolymerization or without prepolymerization will be described.

Specific examples of the olefins which can be used (that is, polymerized) for the polymerization include α-olefins having 3 to 20 carbon atoms, for example, linear olefins such as propylene, 1-butene, 1-pentene, 1-hexene, 1-octene, 1-decene, 1-dodecene, 1-tetradecene, 1-hexadecene, 1-octadecene and 1-eicosene; and branched olefins such as 4-methyl-1-pentene, 3-methyl-1-pentene and 3-methyl-1-butene, and preferred are propylene, 1-butene, 1-pentene and 4-methyl-1-pentene. Further, particularly preferred are propylene, 1-butene and 4-methyl-1-pentene, from the viewpoint that the polymer having a broader molecular weight distribution easily exhibits its advantages for the resin with high rigidity.

Along with these olefins, ethylene; aromatic vinyl compounds such as styrene and allylbenzene; or alicyclic vinyl compounds such as vinylcyclohexane and vinylcycloheptane can be used. Furthermore, the compound having a polyunsaturated bond such as, for example, conjugated dienes or nonconjugated dienes, for example, dienes such as cyclopentene, cycloheptene, norbornene, tetracyclododecene, isoprene and butadiene can be used as the polymerization materials together with an olefin. These compounds may be used alone or in combination of two or more kinds thereof. (Hereinafter, the olefins to be used together with the "α-olefin having 3 to 20 carbon atoms" may be also referred to as "other olefins"). Among such other olefins, preferred are ethylene and the aromatic vinyl compounds. Further, small amount, for example, 10% by weight or less, and preferably 5% by weight, based on 100% by weight of the total amount of olefins, of the other olefins such as ethylene may be used in combination therewith.

According to the invention, the prepolymerization and the polymerization can be carried out in any of liquid phase polymerizations such as bulk polymerization, solution polymerization and suspension polymerization, and vapor phase polymerization.

When slurry polymerization is employed for the polymerization, the inert hydrocarbons used in the prepolymerization as described above, or an olefin which is liquid at a reaction temperature can be used as a reaction solvent.

In the polymerization in the process for producing the olefin polymer of the invention, the above-described solid titanium catalyst component (I) is used in an amount of usually about 0.0001 to 0.5 mmol, and preferably about 0.005 to 0.1 mmol, in terms of titanium atom, based on 1 liter of the polymerization volume. Further, the above-described organometallic compound catalyst component (II) is used in an amount of usually about 1 to 2000 mol, and preferably about 5 to 500 mol, in terms of titanium atom in the prepolymerization catalyst component in the polymerization system. The above-described catalyst component (III), if used, is used in an amount of 0.001 to 50 mol, preferably 0.01 to 30 mol, and particularly preferably 0.05 to 20 mol in the organometallic compound catalyst component (II).

If the polymerization is carried out in the presence of hydrogen, the molecular weight of the obtained polymer can be controlled to obtain a polymer with a high melt flow rate.

In the polymerization according to the invention, the polymerization temperature of olefins is in the range of usually about 20 to 200° C., preferably about 30 to 100° C., and more preferably about 50 to 90° C. In the process for producing the olefin polymer of the invention, the polymerization can be carried out by any of batchwise, semi-continuous and continuous processes. Further, the polymerization can be carried out in two or more stages under different reaction conditions. When the multi-stage polymerization is carried out, it is possible to further broaden the molecular weight distribution of the olefin polymer.

Thus obtained olefin polymer may be any one of a homopolymer, a random copolymer, a block copolymer, and the like.

If the polymerization of an olefin, in particular the polymerization of propylene is carried out by using the catalyst for olefin polymerization, a propylene polymer with high stereoregularity which has a content of the decane-insoluble components of 70% or more, preferably 85% or more, and particularly preferably 90% or more is obtained.

Further, according to the process for producing an olefin polymer of the invention, even when the polymerization is carried out in a small number of stages, for example, one stage, rather than in multi-stages, a polyolefin having a broad molecular weight distribution can be obtained. The process for producing an olefin polymer of the invention is characterized in that an olefin polymer may be often obtained, which has high molecular weight components, as compared with the conventional olefin polymers having the same melt flow rate (MFR) as the present olefin polymer. These characteristics can be confirmed by gel permeation chromatography (GPC) measurement described below, and a polymer having both of a high Mw/Mn value and a high Mz/Mw value can be obtained.

The conventional polypropylene obtained by using a solid titanium catalyst component comprising magnesium, titanium, halogen and an electron donor in generally has an Mw/Mn value of 5 or less and an Mz/Mw value of less than 4, which are indicators of the molecular weight distribution as determined by GPC measurement, for example, in the region with an MFR of 1 to 10 g/10 min. However, according to the process for producing an olefin polymer of the invention, an olefin polymer having an Mw/Mn value of 6 to 30, and preferably 7 to 20 can be obtained under the same polymerization conditions as described above. Further, an olefin polymer having an Mz/Mw value of preferably 4 to 10, and more preferably 4.5 to 8 can be obtained. Particularly, according to the process for producing an olefin polymer of the invention, a polymer having a high Mz/Mw value can be often obtained.

It is commonly known to a skilled person in the art that polypropylene having a high Mw/Mn value (hereinafter, also referred to as "PP") is excellent in moldability and rigidity. On the other hand, a high Mz/Mw value indicates a high content of high molecular weight components, and thus it is expected that the obtained propylene has high melt tension and excellent moldability.

When the process for producing an olefin polymer of the invention is used, a polymer having a broad molecular weight distribution can be obtained even without the use of multi-stage polymerization, and thus it is possible to make the apparatus for producing a polymer simpler. Further, when the conventional multi-stage polymerization is applied, it is expected that a polymer with more excellent melt tension and moldability can be obtained.

As other methods for obtaining a polymer having a broad molecular weight distribution, the methods of dissolving and mixing, or dissolving and kneading the polymers having different molecular weights can be employed, but the polymers obtained by these methods may have insufficient in improvement on melt tension or moldability, while involving relatively complicated operations. The reason for this is presumed that the polymers having different molecular weights are basically difficult to be mixed with each other. On the other hand, since but the polymers obtained by means of the process for producing an olefin polymer of the invention have incorporated with the polymers having widely different molecular weights in a catalytic level, that is a nano-level, it is expected that they have high melt tension and excellent moldability.

[Solid Titanium Catalyst Component (I-1)]

The solid titanium catalyst component (I-1) according to the invention is characterized in that it comprises titanium, magnesium, halogen, and a cyclic ester compound (a-1) specified by the following formula (2):

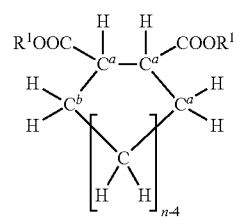

(2)

In the formula (2), n is an integer of 5 to 10, preferably an integer of 5 to 7, and particularly preferably 6. Further, $C^a$ represents a carbon atom.

It is preferable that the bonds between the carbon atoms in the cyclic backbone are all single bonds, but any of single bonds excluding $C^a$—$C^a$ bonds and a $C^a$—$C^b$ bond may be replaced with double bonds.

$R^1$'s are each independently a monovalent hydrocarbon group having 1 to 20 carbon atoms, preferably 1 to 10 carbon atoms, more preferably 2 to 8 carbon atoms, even more preferably 4 to 8 carbon atoms, and particularly preferably 4 to 6 carbon atoms. Examples of the hydrocarbon group include an ethyl group, an n-propyl group, an isopropyl group, an n-butyl group, an isobutyl group, a hexyl group, a heptyl group, an octyl group, a 2-ethylhexyl group, a decyl group, a dodecyl group, a tetradecyl group, a hexadecyl group, an octadecyl group, an eicosyl group, and the like; and among them, preferred are an n-butyl group, an isobutyl group, a hexyl group and an octyl group, and more preferred are an n-butyl group and an isobutyl group.

That is, the solid titanium catalyst component (I-1) also falls within the preferable range of the above-described solid titanium catalyst component (I).

When an olefin having 3 or more carbon atoms is polymerized using the solid titanium catalyst component (I-1) according to the invention, a polymer having a broad molecular weight distribution is obtained. Particularly, it is characterized in that a polymer having a broad molecular weight distribution is easily obtained even at a low internal pressure of the polymerization vessel.

The solid titanium catalyst component (I-1) is obtained by bringing a magnesium compound, a titanium compound and the cyclic ester compound (a-1) into contact with each other. The magnesium compound and the titanium compound to be used are the same as the magnesium compound and the titanium compound used in the production of the above-mentioned solid titanium catalyst component (I).

Examples of the cyclic ester compound (a-1) include
diethyl cyclohexane-1,2-dicarboxylate,
di-n-propyl cyclohexane-1,2-dicarboxylate,
diisopropyl cyclohexane-1,2-dicarboxylate,
di-n-butyl cyclohexane-1,2-dicarboxylate,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
di-2-ethylhexyl cyclohexane-1,2-dicarboxylate,
didecyl cyclohexane-1,2-dicarboxylate,
diethyl cyclopentane-1,2-dicarboxylate,
diisopropyl cyclopentane-1,2-dicarboxylate,
diisobutyl cyclopentane-1,2-dicarboxylate,
diheptyl cyclopentane-1,2-dicarboxylate,
didecyl cyclopentane-1,2-dicarboxylate,
diethyl cyclopentane-1,3-dicarboxylate,
diisobutyl cyclopentane-1,3-dicarboxylate,
diethyl cycloheptane-1,2-dicarboxylate,
diisopropyl cycloheptane-1,2-dicarboxylate,
diisobutyl cycloheptane-1,2-dicarboxylate,
diheptyl cycloheptane-1,2-dicarboxylate,
didecyl cycloheptane-1,2-dicarboxylate,
diethyl cyclooctane-1,2-dicarboxylate,
diethyl cyclodecane-1,2-dicarboxylate,
diethyl 4-cyclohexene-1,2-dicarboxylate,
di-n-propyl 4-cyclohexene-1,2-dicarboxylate,
diisopropyl 4-cyclohexene-1,2-dicarboxylate,
di-n-butyl 4-cyclohexene-1,2-dicarboxylate,
diisobutyl 4-cyclohexene-1,2-dicarboxylate,
dihexyl 4-cyclohexene-1,2-dicarboxylate,
diheptyl 4-cyclohexene-1,2-dicarboxylate,
dioctyl 4-cyclohexene-1,2-dicarboxylate,
didecyl 4-cyclohexene-1,2-dicarboxylate,
diethyl 3-cyclopentene-1,2-dicarboxylate,
diisopropyl 3-cyclopentene-1,2-dicarboxylate,
diisobutyl 3-cyclopentene-1,2-dicarboxylate,
diheptyl 3-cyclopentene-1,2-dicarboxylate,
didecyl 3-cyclopentene-1,2-dicarboxylate,
diethyl 4-cycloheptene-1,2-dicarboxylate,
diisopropyl 4-cycloheptene-1,2-dicarboxylate,
diisobutyl 4-cycloheptene-1,2-dicarboxylate,
diheptyl 4-cycloheptene-1,2-dicarboxylate,
didecyl 4-cycloheptene-1,2-dicarboxylate,
diethyl 5-cyclooctene-1,2-dicarboxylate,
diethyl 6-cyclodecene-1,2-dicarboxylate, and the like.

Among these, preferred are compounds in which the cyclic structures are all single bonds.

For the ester structure as described above, the purity of the trans-isomers (ratio of the trans-isomers in the trans-isomers and the cis-isomers) is preferably 51 to 79%. The purity of the trans-isomers is more preferably 55 to 79%, even more preferably 60 to 79%, and particularly preferably 65 to 79%. Particularly, the purity of the trans-isomers of cyclohexane-1,2-dicarboxylic acid diester wherein n=6 in the above-described formula (2) falls within the above range.

In the case of n=6, when the purity of the trans-isomers is less than 51%, the effect of broadening the molecular weight distribution may be insufficient, and the activity or stereospecificity may be insufficient. In the case of n=6, when the purity of the trans-isomers is more than 79%, the effect of broadening the molecular weight distribution may be insufficient. That is, when the purity of the trans-isomers is within the above-described range, the effect of broadening the molecular weight distribution of the obtained polymer can be highly compatibilized with the activity of the catalyst and the high stereoregularity of the obtained polymer.

Specific examples of the cyclic ester compound (a-1) particularly preferably include
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate and di-2-ethylhexyl cyclohexane-1,2-dicarboxylate, which satisfy the above-described range of the purity of the trans-isomers. The reason for this is that these compounds have high catalytic performances, and can be prepared using a Diels Alder reaction at a relatively low cost.

Further, other components may be contained in the solid titanium catalyst component (I-1) of the invention, as long as they do not give any adverse effect on the purpose of the invention. The components are the same compounds as described for the solid titanium catalyst component (I).

The solid titanium catalyst component (I-1) of the invention can be used for the olefin polymerization, and an olefin polymerization is preferably carried out using this solid titanium catalyst component (I-1) in combination with the above-described organometallic compound catalyst component (II), and, if necessary, the above-described catalyst component (III). Each of the preferable amount to be used of these components, polymerization condition, and the like is the same that as described for the above-described solid titanium catalyst component (I).

The olefin used for prepolymerization or polymerization is also the same that as described in the case of using the above-described solid titanium catalyst component (I).

If the polymerization of an olefin, in particular the polymerization of propylene is carried out by using the solid titanium catalyst component (I-1) of the invention, a propylene polymer with high stereoregularity which has a content of the decane-insoluble components of 70% or more, preferably 85% or more, and more preferably 90% or more is obtained.

Further, by using the solid titanium catalyst component (I-1) of the invention, even when the polymerization is carried out in a small number of stages, for example, one stage, rather than in multi-stages, a polyolefin having a broad molecular weight distribution can be obtained. The use of the solid titanium catalyst component (I-1) of the invention particularly provides the characteristics that an olefin polymer may be often obtained, which has high molecular weight components, as compared with the conventional olefin polymers having the same melt flow rate (MFR) as the present olefin polymer. These characteristics can be confirmed by gel permeation chromatography (GPC) measurement described below, and a polymer having both of a high Mw/Mn value and a high Mz/Mw value can be obtained.

The conventional polypropylene obtained by using a solid titanium catalyst component comprising magnesium, titanium, halogen and an electron donor generally has an Mw/Mn value of 5 or less and an Mz/Mw value of less than 4, which are indicators of the molecular weight distribution as determined by GPC measurement, for example, in the region with an MFR of 1 to 10 g/10 min. However, when the solid titanium catalyst component (I-1) of the invention is used, an olefin polymer having an Mw/Mn value of 6 to 30, and preferably 7 to 20 can be obtained under the above same polymerization conditions. Further, an olefin polymer having an Mz/Mw value of preferably 4 to 10, and more preferably 4.5 to 8 can be obtained. Particularly, when the solid titanium catalyst component (I-1) of the invention is used, an olefin polymer having a high Mz/Mw value is often obtained.

It is commonly known to a skilled person in the art that PP having a high Mw/Mn value is excellent in moldability and rigidity. On the other hand, a high Mz/Mw value indicates a high content of high molecular weight components, and thus it is expected that there is much potential for the obtained propylene to have high melt tension and excellent moldability.

When the solid titanium catalyst component (I-1) of the invention is used, a polymer having a broad molecular weight distribution can be obtained even without the use of multi-stage polymerization, and thus it is possible to make the apparatus for producing a polymer simpler. Further, when the conventional multi-stage polymerization is applied, it is expected that a polymer with more excellent melt tension and moldability can be obtained.

As other methods for obtain a polymer having a broad molecular weight distribution, the methods of dissolving and mixing, or dissolving and kneading the polymers having different molecular weights can be employed, but the polymers obtained by these methods may be insufficient in the improvement on melt tension or moldability, while involving relatively complicated operations. The reason for this is presumed that the polymers having different molecular weights are basically difficult to be mixed with each other. On the other hand, since the polymers obtained by using the solid titanium catalyst component (I-1) of the invention are mixture of the polymers having extremely broad, different molecular weights in a catalytic level, that is, a nano-level, it is expected that they have high melt tension and excellent moldability.

EXAMPLES

Hereinbelow, the present invention will be described with reference to Examples, but it should be not construed that the invention is limited to these Examples.

In the following Examples, the bulk specific gravity, the melt flow rate, the content of the decane-soluble (insoluble) components, the molecular weight distribution, or the like of the polymers such as propylene, etc. were measured by the methods as described below.

(1) Bulk Specific Gravity:

The bulk specific gravity was measured in accordance with JIS K-6721.

(2) Melt Flow Rate (MFR):

The melt flow rate (MFR) was measured in accordance with ASTM D 1238E at a measurement temperature of 230° C. in the case of a propylene polymer, and 260° C. in the case of a 4-methyl-1-pentene polymer.

(3) Content of Decane-Soluble (Insoluble) Components:

Into the glass container for measurement were introduced about 3 g (measurement was made in the order of $10^{-4}$ g, and the weight was expressed by b (g) in the following equation) of a propylene polymer, 500 ml of decane, and a small amount of a heat-resistant stabilizer soluble in decane, and the mixture was stirred with a stirrer while elevating the temperature to 150° C. over 2 hours under a nitrogen atmosphere to dissolve the propylene polymer, maintained at 150° C. for 2 hours, and then slowly cooled to 23° C. over 8 hours. The solution containing the obtained precipitates of the propylene polymer was filtered under reduced pressure with a glass filter of a 25G-4 specification manufactured by Iwata glass Co., Ltd. 100 ml of the filtrate was taken and dried under reduced pressure to obtain a portion of the decane-soluble components, the weight of which was measured in the order of $10^{-4}$ g (this weight was represented by a (g) in the following equation). After this operation, the amount of the decane-soluble components was determined by the following equation:

Content of decane-soluble components=$100 \times (500 \times a)/(100 \times b)$

Content of decane-insoluble components=$100 - 100 \times (500 \times a)/(100 \times b)$ (4) Molecular Weight Distribution:

The Mw/Mn value and the Mz/Mw value were calculated by analyzing, using a well-known method, the chromatogram obtained by the measurement under the following conditions. The measurement time per one sample was 60 minutes.

Liquid chromatograph: ALC/GPC 150-C plus type manufactured by Waters Co., Ltd. (Integrated type differential refractometer-detector)

Column: GMH6-HT×2 and GMH6-HTL×2 manufactured by Tosoh Corporation connected in series Mobile phase medium: o-dichlorobenzene Flow rate: 1.0 ml/min Measurement temperature: 140° C.

Process for producing calibration curve: Using standard polystyrene sample

Concentration of sample: 0.10% (w/w)

Amount of sample solution: 500 μl (5) Melt Tension:

Using an apparatus for measurement of melt tension provided with an equipment for measurement of melt tension in a Capirograph "1B" type apparatus manufactured by Toyo Seiki Seisaku-sho, Ltd., the strand of the sample resin, melted for 6 minutes in the cylinder at 230° C. (under a nitrogen atmosphere) in the apparatus, was extruded through a nozzle having a length of 8 mm and a diameter of 2.095 mm with a piston. The extrusion speed of the piston was 15 mm/min. This strand was pulled out in the shape of a filament, and wound up using a roller at a predetermined speed through a pulley provided with the load cell. At this time, the stress force as defected with the load cell was referred to a melt tension.

(6) Purity of Trans-Isomers:

In addition, as the compound corresponding to the above-described cyclic ester compound (a) (cyclic ester compound (a-1)), a product synthesized by AZUMA-Japan, Inc. was used unless specifically mentioned otherwise. The purities of the trans-isomer or the cis-isomer are both 95% or more unless specifically mentioned otherwise.

The purity of the trans-isomers was determined by the measurement using a conventional method of Nuclear Magnetic Resonance Spectrum (NMR). Specific conditions for measurement condition are as follows.

In the case of the compound having the purity of more than 5% and less than 95%, the purity of the isomers was controlled by mixing each of the predetermined ratios of the trans-isomeric compounds (compound having a purity of the trans-isomers of 95% or more) and the cis-isomeric compounds (compound having a purity of the cis-isomers of 95% or more).

The purity of the trans-isomers were calculated by conducting $^1$H-NMR measurement under the following conditions, and using the area ($A^t$) of the trans-isomers of methine hydrogen which bonds to the carbon atom ($C^\alpha$ in the formulas (1) and (2)) to which $COOR^1$ is bonded, and the area ($A^s$) of the signals of the cis-isomers, by means of the following equation:

Apparatus: JEOL GSX-400 type
Solvent: Heavy chloroform
Standard material: Tetramethylsilane
Temperature: 25° C.
Accumulation times: 40
Repetition time: 6 seconds
Ratio of trans-isomers: $100 \times A^t/(A^t+A^s)$ The signals of the cis-isomers are detected in the lower field than that of the signals of the trans-isomers. The difference varies depending on the structure thereof, but is approximately 0.2 to 0.4 ppm. The specific position varies depending on the structure thereof, but the cis-isomers are detected in the position of 2.7 to 3.2 ppm, and the trans-isomers are detected in the position of 2.5 to 3.0 ppm.

(7) Melting Point, Crystallization Temperature:

The melting point and the crystallization temperature were measured by a conventional method using a DSC device. Specifically, the measurement is as follows.

The polymer was melted at 200° C. for 5 minutes and pressed at a pressure of 3 to 5 MPa to obtain a press sheet. About 5 mg of this press sheet was subjected to DSC measurement under the following conditions.

DSC device: Perkin Elmer DSC-7 type device
Conditions for elevating or lowering temperature:
First step—Elevating the temperature from room temperature to 200° C. at a temperature elevating rate of 320° C./min, and maintaining at 200° C. for 10 minutes;
Second step—Lowering the temperature from 200° C. to 30° C. at a temperature lowering rate of 10° C./min, and maintaining at 30° C. for 5 minutes; and
Third step—Elevating the temperature from 30° C. to 200° C. at a temperature elevating rate of 10° C./min
(The crystallization temperature is observed at a time of lowering the temperature in the second step, and the melting point is observed at a time of elevating the temperature in the third step.)

Example 1

Production of Solid Titanium Catalyst Component (α1)

A high speed stirring device having an internal volume of 2 liters (manufactured by Tokushu Kika Kogyo Co., Ltd.) was thoroughly purged with nitrogen, and 700 ml of purified decane, 10 g of commercial available magnesium chloride, 24.2 g of ethanol and 3 g of Leodol (trade name) SP-S20 (sorbitan distearate, manufactured by Kao Corporation) were charged thereinto. While stirring this suspension, the temperature of the system was elevated and the suspension was stirred at 120° C. and 800 rpm for 30 minutes. Then, this suspension was transferred to a 2-liter glass flask (equipped with a stirrer) which was previously charged with 1 liter of purified decane cooled to −10° C. by using a Teflon (registered trade mark) tube having an inner diameter of 5 mm under high speed stirring so as not to generate the precipitates. The solid obtained from this solution was filtered and sufficiently washed with purified n-heptane to obtain a solid adduct in which 2.8 mol of ethanol is coordinated to 1 mol of magnesium chloride.

46.2 mmol of the solid adduct, in terms of magnesium atom, which was suspended in 30 ml of decane, was wholly introduced into 200 ml of titanium tetrachloride which was maintained at −20° C., under stirring. The temperature of the mixed solution was elevated to 80° C. over 5 hours. When the temperature reached 80° C., diethyl cyclohexane-1,2-dicarboxylate (trans-isomer: 33%) was added thereto in a proportion of 0.15 mol, based on 1 mol of magnesium atom in the solid adduct, and then the temperature thereof was elevated to 120° C. over 40 minutes. The temperature was maintained at 120° C. under stirring for 90 minutes to effect the reaction.

After the completion of the reaction for 90 minutes, a solid portion was recovered by hot filtration. This solid portion was resuspended in 200 ml of titanium tetrachloride, and the temperature thereof was elevated to 130° C., and then maintained at that temperature under stirring for 45 minutes to effect reaction. After the completion of the reaction for 45 minutes, a solid portion was recovered again by hot filtration. The recovered solid portion was sufficiently washed with decane and heptane at 100° C. until a free titanium compound was no longer detected in the washing solution.

Thus, the solid titanium catalyst component (α1) which was prepared in the above procedure was stored as a decane slurry. An aliquot portion of the slurry was picked and dried to examine the catalyst composition.

The composition of thus obtained solid titanium catalyst component (α1) was such that titanium was 2.4 mass %, magnesium was 20 mass %, chlorine was 65 mass %, and an ethanol residue was 0.3 mass %.

(Polymerization)

To a polymerization vessel with an internal volume of 2 liters, 500 g of propylene and 1 NL of hydrogen were added at room temperature, and then 0.5 mmol of triethylaluminum, 0.1 mmol of cyclohexylmethyldimethoxysilane and 0.004 mmol, in terms of titanium atom, of the solid catalyst component prepared in the above (α1) were added thereto, and the internal temperature of the polymerization vessel was rapidly elevated to 70° C. At this time, the internal pressure of the polymerization vessel was 3.1 MPa (gauge pressure) (absolute pressure: 3.2 MPa). After polymerization at 70° C. for 1 hour, a small amount of methanol was added thereto to stop the reaction, and propylene was purged. The obtained polymer particles were dried under reduced pressure overnight at 80° C.

The activity of the catalyst, and the MFR, the content of the decane-insoluble components, the bulk specific gravity, and the molecular weight distribution (Mw/Mn, Mz/Mw) of the obtained polymer were shown in Table 1.

Further, the saturation vapor pressure of propylene at 70° C. is 3.0 MPa.

Example 2

Production of Solid Titanium Catalyst Component (α2)

In the same manner as in Example 1 except that a trans-isomer of diethyl cyclohexane-1,2-dicarboxylate was used instead of diethyl cyclohexane-1,2-dicarboxylate (trans-isomer: 33%), a solid titanium catalyst component (α2) was obtained.

(Polymerization)

In the same manner as in Example 1 except that the solid titanium catalyst component (α1) was used instead of solid titanium catalyst component (α2), the propylene polymerization was carried out. The results were shown in Table 1.

Example 3

Production of Solid Titanium Catalyst Component (α3)

In the same manner as in Example 1 except that di-n-octyl cyclohexane-1,2-dicarboxylate (trans-isomer: 29%) was used instead of diethyl cyclohexane-1,2-dicarboxylate (trans-isomer: 33%), a solid titanium catalyst component (α3) was obtained.

(Polymerization)

In the same manner as in Example 1 except that the solid titanium catalyst component (α3) was used, the propylene polymerization was carried out. The results were shown in Table 1.

Example 4

Production of Solid Titanium Catalyst Component (α4)

In the same manner as in Example 1 except that a trans-isomer of diisobutyl cyclohexane-1,2-dicarboxylate was used instead of diethyl cyclohexane-1,2-dicarboxylate (trans-isomer: 33%), a solid titanium catalyst component (α4) was obtained.

(Polymerization)

In the same manner as in Example 1 except that the solid titanium catalyst component (α4) was used, the propylene polymerization was carried out. The results were shown in Table 1.

Example 5

Production of Solid Titanium Catalyst Component (α5)

In the same manner as in Example 1 except that diethyl 4-cyclohexene-1,2-dicarboxylate (trans-isomer: 50%) was used instead of diethyl cyclohexane-1,2-dicarboxylate (trans-isomer: 33%), a solid titanium catalyst component (α5) was obtained.

(Polymerization)

In the same manner as in Example 1 except that the solid titanium catalyst component (α5) was used, the propylene polymerization was carried out. The results were shown in Table 1.

Example 6

Production of Solid Titanium Catalyst Component (α6)

In the same manner as in Example 1 except that a trans-isomer of diethyl 4-cyclohexene-1,2-dicarboxylate was used instead of diethyl cyclohexane-1,2-dicarboxylate (trans-isomer: 33%), a solid titanium catalyst component (α6) was obtained.

(Polymerization)

In the same manner as in Example 1 except that the solid titanium catalyst component (α6) was used, the propylene polymerization was carried out. The results were shown in Table 1.

Example 7

Production of Solid Titanium Catalyst Component (α7)

In the same manner as in Example 1 except that a trans-isomer of diethyl 4-cyclohexene-1,2-dicarboxylate was used in a proportion of 0.125 mol relative to 1 mol of magnesium, instead of diethyl cyclohexane-1,2-dicarboxylate (trans-isomer: 33%) (0.15 mol relative to 1 mol of magnesium), a solid titanium catalyst component (α7) was obtained.

(Polymerization)

In the same manner as in Example 1 except that the solid titanium catalyst component (α7) was used, the propylene polymerization was carried out. The results were shown in Table 1.

Example 8

Production of Solid Titanium Catalyst Component (α8)

In the same manner as in Example 1 except that a trans-isomer of diisobutyl 4-cyclohexene-1,2-dicarboxylate was used instead of diethyl cyclohexane-1,2-dicarboxylate (trans-isomer: 33%), a solid titanium catalyst component (α8) was obtained.

(Polymerization)

In the same manner as in Example 1 except that the solid titanium catalyst component (α8) was used, the propylene polymerization was carried out. The results were shown in Table 1.

Example 9

Production of Solid Titanium Catalyst Component (α9)

In the same manner as in Example 1 except that a cis-isomer of di-n-octyl 4-cyclohexene-1,2-dicarboxylate was used instead of diethyl cyclohexane-1,2-dicarboxylate (trans-isomer: 33%), a solid titanium catalyst component (α9) was obtained.

(Polymerization)

In the same manner as in Example 1 except that the solid titanium catalyst component (α9) was used, the propylene polymerization was carried out. The results were shown in Table 1.

Example 10

Production of Solid Titanium Catalyst Component (α10)

In the same manner as in Example 1 except that di-n-octyl 4-cyclohexene-1,2-dicarboxylate (trans-isomer: 50%) was used instead of diethyl cyclohexane-1,2-dicarboxylate (trans-isomer: 33%), a solid titanium catalyst component (α10) was obtained.

(Polymerization)

In the same manner as in Example 1 except that the solid titanium catalyst component (α10) was used, the propylene polymerization was carried out. The results were shown in Table 1.

Example 11

Production of Solid Titanium Catalyst Component (α11)

In the same manner as in Example 1 except that diisobutyl cyclopentane-1,2-dicarboxylate (trans-isomer) was used instead of diethyl cyclohexane-1,2-dicarboxylate (trans-isomer: 33%), a solid titanium catalyst component (α11) was obtained.

(Polymerization)

In the same manner as in Example 1 except that the solid titanium catalyst component (α11) was used, the propylene polymerization was carried out. The results were shown in Table 1.

Example 12

Production of Solid Titanium Catalyst Component (α12)

In the same manner as in Example 1 except that diisobutyl cycloheptane-1,2-dicarboxylate (trans-isomer) was used instead of diethyl cyclohexane-1,2-dicarboxylate (trans-isomer: 33%), a solid titanium catalyst component (α12) was obtained.

(Polymerization)

In the same manner as in Example 1 except that the solid titanium catalyst component (α12) was used, the propylene polymerization was carried out. The results were shown in Table 1.

Example 13

Production of Solid Titanium Catalyst Component (α13)

First, in the same manner as in Example 1, 2.8 mol of ethanol was coordinated to 1 mol of magnesium chloride to obtain a solid adduct.

46.2 mmol of the solid adduct, in terms of magnesium atom, which was suspended in 30 ml of decane, was wholly introduced to 200 ml of titanium tetrachloride which was maintained at −20° C., under stirring. The temperature of the mixed solution was elevated to 80° C. over 5 hours. When the temperature reached 80° C., 2-isobutyl-2-isopropyl-1,3-dimethoxypropane was added thereto in a proportion of 0.15 mol, based on 1 mol of magnesium atom in the solid adduct, and then the temperature thereof was elevated to 120° C. over 40 minutes. When the temperature reached 120° C., diethyl 4-cyclohexene-1,2-dicarboxylate (trans-isomer) was added thereto in a proportion of 0.15 mol, based on 1 mol of magnesium atom in the solid adduct, and then the temperature thereof was maintained at 120° C. over 90 minutes under stirring.

After the completion of the reaction for 90 minutes, a solid portion was recovered by hot filtration. This solid portion was resuspended in 200 ml of titanium tetrachloride, and the temperature thereof was elevated to 130° C., and then maintained at that temperature under stirring for 45 minutes to effect reaction. After the completion of the reaction for 45 minutes, a solid portion was recovered again by hot filtration. The recovered solid portion was sufficiently washed with decane and heptane at 100° C. until a free titanium compound was no longer detected in the washing solution.

Thus, the solid titanium catalyst component (α13) which was prepared in the above procedure was stored as a decane slurry. An aliquot portion of the slurry was picked and dried to examine the catalyst composition.

The composition of the thus obtained solid titanium catalyst component (α13) was such that titanium was 2.0 mass %, magnesium was 19 mass %, chlorine was 60 mass %, and an ethanol residue was 0.2 mass %.

(Polymerization)

To a polymerization vessel with an internal volume of 2 liters, 500 g of propylene, and 1 NL of hydrogen were added at room temperature, and then 0.5 mmol of triethylaluminum, 0.1 mmol of cyclohexylmethyldimethoxysilane and 0.004 mmol, in terms of titanium atom, of the solid catalyst component (α13) were added thereto, and the internal temperature of the polymerization vessel was rapidly elevated to 70° C. After polymerization at 70° C. for 1 hour, a small amount of methanol was added thereto to stop the reaction, and propylene was purged. The obtained polymer particles were dried under reduced pressure overnight at 80° C.

The activity of the catalyst, and the MFR, the content of the decane-insoluble components, the bulk specific gravity, and the molecular weight distribution (Mw/Mn, Mz/Mw) of the obtained polymer were shown in Table 1.

Example 14

Production of Solid Titanium Catalyst Component (α14)

In the same manner as in Example 13 except that diisobutyl phthalate (reagent of special grade, manufactured by Wako Pure Chemicals, Co., Ltd.) was used in a proportion of 0.10 mol, based on 1 mol of magnesium atom in the solid adduct, instead of 2-isobutyl-2-isopropyl-1,3-dimethoxypropane, and diisobutyl cyclohexane-1,2-dicarboxylate (trans-isomer) was used in a proportion of 0.05 mol, based on 1 mol of magnesium atom in the solid adduct, instead of diethyl 4-cyclohexene-1,2-dicarboxylate (trans-isomer), a solid titanium catalyst component (α14) was obtained.

(Polymerization)

In the same manner as in Example 1 except that the solid titanium catalyst component (α14) was used, the propylene polymerization was carried out. The results were shown in Table 1.

Example 15

Production of Solid Titanium Catalyst Component (α15)

First, in the same manner as in Example 1, 2.8 mol of ethanol was coordinated to 1 mol of magnesium chloride to obtain a solid adduct.

46.2 mmol of the solid adduct, in terms of magnesium atom, which was suspended in 30 ml of decane, was wholly introduced to 200 ml of titanium tetrachloride which was maintained at −20° C., under stirring. The temperature of the mixed solution was elevated to 80° C. over 5 hours. When the temperature reached 80° C., diisobutyl cyclohexane-1,2-dicarboxylate (ratio of trans-isomer: 78%) was added thereto in a proportion of 0.15 mol, based on 1 mol of magnesium atom in the solid adduct, and then the temperature thereof was elevated to 90° C. over 10 minutes. When the temperature reached 90° C., 2-isobutyl-2-isopropyl-1,3-dimethoxypropane was added thereto in a proportion of 0.05 mol, based on 1 mol of magnesium atom in the solid adduct, and then the temperature thereof was maintained at 90° C. over 90 minutes under stirring to effect the reaction.

After the completion of the reaction for 90 minutes, a solid portion was recovered by hot filtration. This solid portion was resuspended in 200 ml of titanium tetrachloride, and the temperature thereof was elevated to 90° C., and then maintained at 90° C. under stirring for 45 minutes to effect reaction. After the completion of the reaction for 45 minutes, a solid portion was recovered again by hot filtration. The recovered solid portion was sufficiently washed with decane and heptane at 100° C. until a free titanium compound was no longer detected in the washing solution.

Thus, the solid titanium catalyst component (α15) which was prepared in the above procedure was stored as a decane slurry. An aliquot portion of the slurry was picked and dried to examine the catalyst composition.

The composition of the thus obtained solid titanium catalyst component (α15) was such that titanium was 3.2 mass %, magnesium was 17 mass %, chlorine was 60 mass %, an ethanol residue of 0.7 mass %, diisobutyl cyclohexane-1,2-dicarboxylate was 14.6 mass %, and 2-isobutyl-2-isopropyl-1,3-dimethoxypropane was 3.5 mass %.

(Polymerization)

In the same manner as in Example 1 except that the solid titanium catalyst component (α15) was used, the propylene polymerization was carried out. The results were shown in Table 1.

Comparative Example 1

Synthesis of Solid Titanium Catalyst Component (β1)

In the same manner as in Example 1 except that diisobutyl phthalate (reagent of special grade, manufactured by Wako Pure Chemicals, Co., Ltd.) was used instead of diethyl cyclohexane-1,2-dicarboxylate (trans-isomer: 33%), a solid titanium catalyst component (β1) was obtained.

(Polymerization)

In the same manner as in Example 1 except that the solid titanium catalyst component (β1) was used, the propylene polymerization was carried out. The results were shown in Table 1.

Comparative Example 2

Synthesis of Diethyl 2,3-diisopropylsuccinate

In the same manner as described in the Patent Document 5, diethyl 2,3-diisopropylsuccinate was synthesized.

Synthesis of Solid Titanium Catalyst Component (β2)

In the same manner as in Example 1 except that diethyl 2,3-diisopropylsuccinate was used instead of diethyl cyclohexane-1,2-dicarboxylate (trans-isomer: 33%), a solid titanium catalyst component (12) was obtained.

(Polymerization)

In the same manner as in Example 1 except that the solid titanium catalyst component (β2) and 1.6 NL of hydrogen were used, the propylene polymerization was carried out. At this time, the internal pressure of the polymerization vessel was 3.2 MPa (absolute pressure: 3.3 MPa). The results were shown in Table 1.

Comparative Example 3

Synthesis of Solid Titanium Catalyst Component (β3)

In the same manner as in Example 1 except that diisobutyl 1-cyclohexene-1,2-dicarboxylate was used instead of diethyl cyclohexane-1,2-dicarboxylate (trans-isomer: 33%), a solid titanium catalyst component (β3) was obtained.

(Polymerization)

In the same manner as in Example 1 except that the solid titanium catalyst component (β3) was used, the propylene polymerization was carried out. The results were shown in Table 1.

TABLE 1

|  |  | P1*/ MPa | P1/P2* | Activity kg-PP/g-Cat | MFR g/10 min | Content of Decane-insoluble components wt % | Bulk specific gravity g/ml | Mw/Mn | Mz/Mw |
|---|---|---|---|---|---|---|---|---|---|
| Ex. 1 | Diethyl cyclohexane-1,2-dicarboxylate (trans-isomer: 33%) | 3.2 | 1.07 | 20.6 | 6.8 | 94.9 | 0.42 | 13.7 | 4.7 |
| Ex. 2 | Diethyl cyclohexane-1,2-dicarboxylate (trans-isomer) | 3.2 | 1.07 | 20.8 | 4.7 | 96.5 | 0.39 | 6.6 | 4.6 |
| Ex. 3 | Di-n-octyl cyclohexane-1,2-dicarboxylate (trans-isomer: 29%) | 3.2 | 1.07 | 27.0 | 7.8 | 95.3 | 0.43 | 6.9 | 5.1 |
| Ex. 4 | Diisobutyl cyclohexane-1,2-dicarboxylate (trans-isomer) | 3.2 | 1.07 | 29.8 | 4.6 | 97.0 | 0.42 | 6.9 | 4.9 |
| Ex. 5 | Diethyl 4-cyclohexene-1,2-dicarboxylate (trans-isomer: 50%) | 3.2 | 1.07 | 11.5 | 6.9 | 96.1 | 0.44 | 10.1 | 5.7 |
| Ex. 6 | Diethyl 4-cyclohexene-1,2-dicarboxylate (trans-isomer) | 3.2 | 1.07 | 13.2 | 4.6 | 97.2 | 0.41 | 7.6 | 4.7 |

TABLE 1-continued

|  |  | P1*/ MPa | P1/P2* | Activity kg-PP/g-Cat | MFR g/10 min | Content of Decane-insoluble components wt % | Bulk specific gravity g/ml | Mw/Mn | Mz/Mw |
|---|---|---|---|---|---|---|---|---|---|
| Ex. 7 | Diethyl 4-cyclohexene-1,2-dicarboxylate (trans-isomer) (0.125 mol/Mg-1 mol) | 3.2 | 1.07 | 21.5 | 5.7 | 97.1 | 0.42 | 11.5 | 4.7 |
| Ex. 8 | Diisobutyl 4-cyclohexene-1,2-dicarboxylate (trans-isomer) | 3.2 | 1.07 | 22.5 | 6.8 | 96.5 | 0.42 | 10.3 | 5.4 |
| Ex. 9 | Di-n-octyl 4-cyclohexene-1,2-dicarboxylate (cis-isomer) | 3.2 | 1.07 | 19.7 | 9.2 | 93.2 | 0.42 | 6.5 | 6.0 |
| Ex. 10 | Di-n-octyl 4-cyclohexene-1,2-dicarboxylate (trans-isomer: 50%) | 3.2 | 1.07 | 26.0 | 7.8 | 95.2 | 0.43 | 8.1 | 4.8 |
| Ex. 11 | Diisobutyl cyclopentane-1,2-dicarboxylate (trans-isomer) | 3.2 | 1.07 | 22.2 | 12.5 | 95.5 | 0.50 | 7.3 | 5.7 |
| Ex. 12 | Diisobutyl cycloheptane-1,2-dicarboxylate (trans-isomer) | 3.2 | 1.07 | 17.4 | 10.5 | 96.1 | 0.48 | 7.9 | 5.3 |
| Ex. 13 | 2-Isobutyl-2-isopropyl-1,3-dimethoxypropane, diethyl 4-cyclohexene-1,2-dicarboxylate (trans-isomer) | 3.2 | 1.07 | 13.7 | 6.0 | 98.4 | 0.44 | 7.0 | 4.8 |
| Ex. 14 | Diisobutyl phthalate, diisobutyl cyclohexane-1,2-dicarboxylate (trans-isomer) | 3.2 | 1.07 | 23.1 | 5.6 | 97.7 | 0.46 | 7.4 | 5.0 |
| Ex. 15 | 2-Isobutyl-2-isopropyl-1,3-dimethoxypropane, diisobutyl cyclohexane-1,2-dicarboxylate (trans-isomer: 78%) | 3.2 | 1.07 | 33.2 | 6.0 | 98.2 | 0.40 | 7.0 | 5.1 |
| Comp. Ex. 1 | Diisobutyl phthalate | 3.2 | 1.07 | 22.1 | 5.0 | 98.5 | 0.49 | 4.3 | 3.0 |
| Comp. Ex. 2 | Diethyl 2,3-diisopropylsuccinate | 3.3 | 1.1 | 39.7 | 5.6 | 97.2 | 0.39 | 8.6 | 4.4 |
| Comp. Ex. 3 | Diisobutyl 1-cyclohexene-1,2-dicarboxylate | 3.3 | 1.1 | 10.8 | 22.2 | 86.2 | 0.41 | 5.6 | 4.0 |

*P1: Internal pressure of the polymerization vessel at 70° C., P2: Saturation vapor pressure of propylene at 70° C. (3.0 MPa)

It can be seen that polypropylene obtained by using the process for producing an olefin polymer of the invention is a polymer having a broad molecular weight distribution. In particular, it is characterized that when comparing the PP's (polypropylene) having almost the same MFR values with each other, the Mz/Mw values are high, which shows high contents of the high molecular weight components.

It can be further seen that polypropylene obtained by using the solid titanium catalyst component of the invention is a polymer having a broad molecular weight distribution. In particular, it is characterized that when comparing the PP's having almost the same MFR values with each other, the Mz/Mw values are high, which shows high contents of the high molecular weight components.

Example 16

Production of Solid Titanium Catalyst Component (α16)

75 g of anhydrous magnesium chloride, 280.3 g of decane and 308.3 g of 2-ethylhexyl alcohol were reacted under heating at 130° C. for 3 hours to obtain a homogeneous solution, to which 17.7 g of ethyl benzoate was added, and mixed under stirring at 100° C. for 1 hour.

The thus obtained homogeneous solution was cooled to room temperature, and 30 ml of the homogeneous solution was wholly dropwise introduced to 80 ml of titanium tetrachloride which was maintained at −20° C. under stirring to obtain a mixed solution. After completion of introduction, the temperature of the mixed solution was elevated to 97.5° C. over 3.8 hours. When the temperature reached 97.5° C., diisobutyl cyclohexane-1,2-dicarboxylate (ratio of trans-isomer: 78%) was added to the mixed solution in a proportion of 0.25 mol-fold relative to 1 mol of an Mg atom, and maintained at the same temperature for 2 hours under stirring to effect the reaction. After the completion of the reaction for 2 hours, a solid portion was recovered by hot filtration. This solid portion was resuspended in 100 ml of titanium tetrachloride, and again reacted under heating at 97.5° C. for 2 hours. After the completion of the reaction, a solid portion was recovered again by hot filtration. The recovered solid portion was sufficiently washed with decane and hexane at 100° C. until a free titanium compound was no longer detected in the washing solution. The obtained solid titanium catalyst component (α16) which was prepared in the above procedure was stored as a decane slurry, and an aliquot portion of the slurry was picked and dried to examine the catalyst composition. The composition of the thus obtained solid titanium catalyst component (α16) was such that titanium was 2.6 mass %, magnesium was 18 mass %, chlorine was 55 mass %, diisobutyl cyclohexane-1,2-dicarboxylate was 15.9 mass %, and a 2-ethylhexyl alcohol residue of 0.3 mass %.

(Polymerization)

To a polymerization vessel with an internal volume of 2 liters, 500 g of propylene and 1 NL of hydrogen were added at room temperature, and then 0.5 mmol of triethylaluminum, 0.1 mmol of diethylaminotriethoxysilane and 0.004 mmol, in terms of titanium atom, of the solid catalyst component (α16) were added thereto, and the internal temperature of the polymerization vessel was rapidly elevated to 70° C. At this time, the internal pressure of the polymerization vessel was 3.1 MPa (gauge pressure) (absolute pressure: 3.2 MPa). After polymerization at 70° C. for 1 hour, a small amount of methanol was added thereto to stop the reaction, and propylene was purged. The obtained polymer particles were dried under reduced pressure overnight at 80° C.

The activity of the catalyst, and the MFR, the content of the decane-insoluble components, the bulk specific gravity, and the molecular weight distribution (Mw/Mn, Mz/Mw) of the obtained polymer were shown in Table 2.

Example 17

In the same manner as in Example 16 except that 7.5 NL of hydrogen was used upon polymerization, the propylene polymerization was carried out. At this time, the internal pressure of the polymerization vessel was 3.7 MPa (absolute pressure: 3.8 MPa).

The results of the polymerization were shown in Table 2.

TABLE 2

| | P1*/ MPa | P1/P2* | Activity kg-PP/g-Cat | MFR g/10 min | Content of Decane-insoluble components wt % | Bulk specific gravity g/ml | Mw/Mn | Mz/Mw |
|---|---|---|---|---|---|---|---|---|
| Ex. 16 | 3.2 | 1.07 | 16.9 | 10.5 | 98.4 | 0.45 | 7.9 | 5.8 |
| Ex. 17 | 3.7 | 1.23 | 26.2 | 170 | 98.4 | 0.45 | 7.6 | 4.6 |

*P1: Internal pressure of the polymerization vessel at 70° C., P2: Saturation vapor pressure of propylene at 70° C. (3.0 MPa)

From the results, it is found that a polymer having a broad molecular weight distribution can be obtained even in the presence of a nitrogen-containing alkoxysilane compound.

Example 18

30 ml of the homogeneous solution of magnesium chloride obtained in Example 16 was wholly dropwise introduced to 80 ml of titanium tetrachloride which was maintained at −20° C. over 45 minutes under stirring to obtain a mixed solution. After completion of introduction, the temperature of the mixed solution was elevated to 110° C. over 4 hours. When the temperature reached 110° C., diisobutyl cyclohexane-1,2-dicarboxylate (ratio of trans-isomer: 75%) was added to the mixed solution in a proportion of 0.25 mol-fold relative to 1 mol of an Mg atom, and maintained at the same temperature for 2 hours under stirring to effect the reaction. After the completion of the reaction for 2 hours, a solid portion was recovered by hot filtration. This solid portion was resuspended in 100 ml of titanium tetrachloride, and again reacted under heating at 110° C. for 2 hours. After the completion of the reaction, a solid portion was recovered again by hot filtration. The recovered solid portion was sufficiently washed with decane and hexane at 100° C. until a free titanium compound was no longer detected in the washing solution, thus obtaining a solid titanium catalyst component (α18).

(Polymerization)

In the same manner as in Example 16 except that the solid titanium catalyst component (α18) was used, the propylene polymerization was carried out. At this time, the internal pressure of the polymerization vessel was 3.1 MPa (absolute pressure: 3.2 MPa).

The results were shown in Table 3.

Example 19

In the same manner as in Example 18 except that instead of 500 g of propylene, 240 ml of heptane purified by using activated alumina and 380 g of propylene were used, and 0.65 NL of hydrogen were used, the propylene polymerization was carried out. At this time, the internal pressure of the polymerization vessel was 2.5 MPa (absolute pressure: 2.6 MPa).

The results were shown in Table 3.

Example 20

In the same manner as in Example 18 except that instead of 500 g of propylene, 560 ml of heptane purified by using activated alumina and 220 g of propylene were used, and 0.45 NL of hydrogen was used, the propylene polymerization was carried out. At this time, the internal pressure of the polymerization vessel was 1.6 MPa (absolute pressure: 1.7 MPa).

The results were shown in Table 3.

Comparative Example 4

Production of Solid Titanium Catalyst Component (β4)

In the same manner as in Example 18 except that a trans-isomer of diisobutyl cyclohexane-1,2-dicarboxylate was used instead of diisobutyl cyclohexane-1,2-dicarboxylate (ratio of trans-isomer: 75%), a solid titanium catalyst component (β4) was obtained.

(Polymerization)

To a polymerization vessel with an internal volume of 2 liters which was sufficiently purged with nitrogen, 750 ml of purified heptane was introduced at room temperature, 0.75 mmol of triethylaluminum, 0.015 mmol of cyclohexylmethyldimethoxysilane, and 0.015 mmol, in terms of titanium atom, of the solid catalyst component (β4) were added thereto at 40° C. under a propylene atmosphere. Then, the temperature thereof was elevated to 60° C., 0.2 NL of hydrogen was added, the temperature thereof was elevated to 80° C., and then the propylene polymerization was carried out for 1 hour. The pressure during the polymerization was maintained at 0.8 MPa (gauge pressure) (absolute pressure: 0.9 MPa). After completion of the polymerization, the slurry containing the purified solid was filtered, and dried under reduced pressure overnight at 80° C. The results were shown in Table 3.

Further, the saturation vapor pressure of propylene at 80° C. is 3.8 MPa.

Comparative Example 5

Production of Solid Titanium Catalyst Component (β5)

In the same manner as in Example 18 except that a cis-isomer of diisobutyl cyclohexane-1,2-dicarboxylate was used instead of diisobutyl cyclohexane-1,2-dicarboxylate (ratio of trans-isomer: 75%), a solid titanium catalyst component (β5) was obtained.

(Polymerization)

In the same manner as in Comparative Example 4 except that the solid titanium catalyst component (β5) was used, the propylene polymerization was carried out. The results were shown in Table 3.

of 1.6 liter/hr for 1 hour. During this operation, the internal pressure of the reactor was maintained at a normal pressure, and the temperature thereof was maintained at 20° C.

After completion of the supply of propylene, the vapor phase inside the reactor was purged with nitrogen, the washing operation involving removal of the supernatant liquid and addition of purified hexane was repeated twice, and then the remaining solution was resuspended in purified decane, and then wholly transferred to the catalyst bottle to obtain a prepolymerization catalyst component (α21).

(Vapor Phase Polymerization)

To a polymerization vessel with an internal volume of 2 liters which was sufficiently purged with nitrogen, 150 g of sodium chloride (reagent of special grade, manufactured by Wako Pure Chemicals Co., Ltd.) was introduced, and dried under reduce pressure at 90° C. for 1.5 hours. Thereafter, the inside of the system was cooled to 40° C., 1 mmol of triethylaluminum, 0.2 mmol of cyclohexylmethyldimethoxysilane and 0.01 mmol, in terms of titanium atom, of the prepolymerization catalyst component (α21) were introduced thereto. Thereafter, 0.4 NL of hydrogen was introduced thereto, and then the supply of propylene was initiated. The internal pressure of the polymerization vessel was maintained at 1.2 MPa (absolute pressure: 1.3 MPa), and the polymerization was carried out at 70° C. for 1 hour. The results were shown in Table 4.

Comparative Example 6

Vapor Phase Polymerization

To a polymerization vessel with an internal volume of 1 liter which was sufficiently purged with nitrogen, 150 g of sodium chloride (reagent of special grade, manufactured by

TABLE 3

|  | P1*/ MPa | P1/P2* | Activity kg-PP/g-Cat | MFR g/10 min | Content of decane-insoluble components wt % | Bulk specific Gravity g/ml | Mw/Mn | Mz/Mw |
| --- | --- | --- | --- | --- | --- | --- | --- | --- |
| Ex. 18 | 3.2 | 1.07 | 20.4 | 4.0 | 97.2 | 0.42 | 8.2 | 6.2 |
| Ex. 19 | 2.6 | 0.87 | 15.6 | 5.7 | 97.3 | 0.43 | 7.5 | 8.1 |
| Ex. 20 | 1.7 | 0.57 | 8.5 | 5.2 | 97.4 | 0.40 | 7.3 | 5.8 |
| Comp. Ex. 4 | 0.9 | 0.24 | 10.2 | 4.4 | 97.8 | 0.40 | 5.7 | 3.9 |
| Comp. Ex. 5 | 0.9 | 0.24 | 5.3 | 16.6 | 85.0 | 0.40 | 5.0 | 3.8 |

*P1: Internal pressure of the polymerization vessel at 70° C. (Examples 18 to 20) or 80° C. (Comparative Examples 4 to 5)
*P2: Saturation vapor pressure of propylene at 70° C. (3.0 MPa) (Examples 18 to 20), or 80° C. (3.8 MPa) (Comparative Examples 4 to 5)

From the above results, it is found that a polymer having a broad molecular weight distribution cannot be obtained if the internal pressure of the polymerization vessel is low.

Example 21

Prepolymerization

To a 200-mL, four-neck, glass reactor equipped with a stirrer, 50 ml of purified hexane, 1.5 mmol of triethylaluminum, and 0.5 mmol, in terms of titanium atom, of the solid catalyst component (α16) were added under a nitrogen atmosphere. Then, propylene was supplied to the reactor at a rate Wako Pure Chemicals Co., Ltd.) was introduced, and dried under reduce pressure at 90° C. for 1.5 hours. Thereafter, the inside of the system was cooled to 40° C., 0.4 mmol of triethylaluminum, 0.08 mmol of cyclohexylmethyldimethoxysilane and 0.008 mmol, in terms of titanium atom, of the prepolymerization catalyst component (α21) were introduced thereto. Thereafter, 0.1 NL of hydrogen was introduced thereto, and then the supply of propylene was initiated. The internal pressure of the polymerization vessel was maintained at 0.5 MPa (absolute pressure: 0.6 MPa), and the polymerization was carried out at 70° C. for 1 hour. The results were shown in Table 4.

TABLE 4

|  | P1*/ MPa | P1/P2* | Activity kg-PP/g-Cat | MFR g/10 min | Content of decane-insoluble components wt % | Mw/Mn | Mz/Mw |
| --- | --- | --- | --- | --- | --- | --- | --- |
| Ex. 21 | 1.3 | 0.43 | 5.8 | 8.0 | 98.5 | 6.9 | 4.6 |
| Comp. Ex. 6 | 0.6 | 0.2 | 2.1 | 9.2 | 98.8 | 5.8 | 4.0 |

*P1: Internal pressure of the polymerization vessel at 70° C., P2: Saturation vapor pressure of propylene at 70° C. (3.0 MPa)

From the above results, it is found that for the vapor phase polymerization, a polymer having a broad molecular weight distribution cannot be obtained if the internal pressure of the polymerization vessel is low.

Example 22

Production of Solid Titanium Catalyst Component (α22)

In the same manner as in Example 4 except that diisobutyl cyclohexane-1,2-dicarboxylate (ratio of trans-isomer: 78%) was used instead of diisobutyl cyclohexane-1,2-dicarboxylate (trans-isomer), the preparation of a solid titanium catalyst component was carried out, to obtain a solid titanium catalyst component (α22).

(Polymerization)

In the same manner as in Example 1 except that the solid titanium catalyst component (α22) was used instead of the solid titanium catalyst component (α1), the propylene polymerization was carried out. The results were shown in Table 5.

Example 23

Production of Solid Titanium Catalyst Component (α23)

In the same manner as in Example 4 except that diisobutyl cyclohexane-1,2-dicarboxylate (ratio of trans-isomer: 55%) was used instead of diisobutyl cyclohexane-1,2-dicarboxylate (trans-isomer), the preparation of a solid titanium catalyst component was carried out, to obtain a solid titanium catalyst component (α23).

(Polymerization)

In the same manner as in Example 1 except that the solid titanium catalyst component (α23) was used instead of the solid titanium catalyst component (α1), the propylene polymerization was carried out. The results were shown in Table 5.

Example 24

Production of Solid Titanium Catalyst Component (α24)

In the same manner as in Example 4 except that diisobutyl cyclohexane-1,2-dicarboxylate (cis-isomer) was used instead of diisobutyl cyclohexane-1,2-dicarboxylate (trans-isomer), the preparation of a solid titanium catalyst component was carried out, to obtain a solid titanium catalyst component (α24).

(Polymerization)

In the same manner as in Example 1 except that the solid titanium catalyst component (α24) was used instead of the solid titanium catalyst component (α1), the propylene polymerization was carried out. The results were shown in Table 5.

Example 25

Production of Solid Titanium Catalyst Component (α25)

First, in the same manner as in Example 1, 2.8 mol of ethanol was coordinated to 1 mol of magnesium chloride to obtain a solid adduct.

46.2 mmol of the solid adduct, in terms of magnesium atom, which was suspended in 30 ml of decane was wholly introduced under stirring to 200 ml of titanium tetrachloride which was maintained at −20° C., to obtain a mixed solution. The temperature of the mixed solution was elevated to 80° C. over 5 hours. When the temperature reached 80° C., diisobutyl cyclohexane-1,2-dicarboxylate (trans-isomer) was added thereto in a proportion of 0.175 mol, based on 1 mol of magnesium atom in the solid adduct, and then the temperature thereof was elevated to 100° C. over 20 minutes. Then, the temperature was maintained at 100° C. under stirring for 90 minutes to effect the reaction.

After the completion of the reaction for 90 minutes, a solid portion was recovered by hot filtration. This solid portion was resuspended in 200 ml of titanium tetrachloride, and the temperature thereof was elevated to 100° C., and then maintained at 100° C. under stirring for 45 minutes to effect reaction. After the completion of the reaction for 45 minutes, a solid portion was recovered again by hot filtration. The recovered solid portion was sufficiently washed with decane and heptane at 100° C. until a free titanium compound was no longer detected in the washing solution to obtain a solid titanium catalyst component (α25).

(Polymerization)

In the same manner as in Example 1 except that the solid titanium catalyst component (α25) was used instead of the solid titanium catalyst component (α1), the propylene polymerization was carried out. The results were shown in Table 5.

Example 26

Production of Solid Titanium Catalyst Component (α26)

In the same manner as in Example 25 except that diisobutyl cyclohexane-1,2-dicarboxylate (ratio of trans-isomer: 78%)

was used instead of diisobutyl cyclohexane-1,2-dicarboxylate (trans-isomer), the preparation of a solid titanium catalyst component was carried out, to obtain a solid titanium catalyst component (α26).

(Polymerization)

In the same manner as in Example 1 except that the solid titanium catalyst component (α26) was used instead of the solid titanium catalyst component (α1), the propylene polymerization was carried out. The results were shown in Table 5.

Example 27

Production of Solid Titanium Catalyst Component (α27)

In the same manner as in Example 4 except that diisobutyl cyclohexane-1,2-dicarboxylate (ratio of trans-isomer: 55%) was used instead of diisobutyl cyclohexane-1,2-dicarboxylate (trans-isomer), the preparation of a solid titanium catalyst component was carried out, to obtain a solid titanium catalyst component (α27).

(Polymerization)

In the same manner as in Example 1 except that the solid titanium catalyst component (α27) was used instead of the solid titanium catalyst component (α1), the propylene polymerization was carried out. The results were shown in Table 5.

Example 28

Production of Solid Titanium Catalyst Component (α28)

In the same manner as in Example 4 except that diisobutyl cyclohexane-1,2-dicarboxylate (cis-isomer) was used instead of diisobutyl cyclohexane-1,2-dicarboxylate (trans-isomer), the preparation of a solid titanium catalyst component was carried out, to obtain a solid titanium catalyst component (α28).

(Polymerization)

In the same manner as in Example 1 except that the solid titanium catalyst component (α28) was used instead of the solid titanium catalyst component (α1), the propylene polymerization was carried out. The results were shown in Table 5.

From the results, it is found that in the case where the ratio of the trans-isomers is in the range of 51% to 79%, a broad molecular weight distribution can be highly compatibilized with the activity of the catalyst and the high stereoregularity of the obtained polymer.

Example 29

30 ml of the homogeneous solution of magnesium chloride obtained in Example 16 was wholly dropwise introduced to 80 ml of titanium tetrachloride which was maintained at −20° C. over 45 minutes under stirring to obtain a mixed solution. After completion of introduction, the temperature of the mixed solution was elevated to 105° C. over 3.9 hours. When the temperature reached 105° C., diisobutyl cyclohexane-1,2-dicarboxylate (ratio of trans-isomer: 78%) was added to the mixed solution in a proportion of 0.25 mol-fold relative to 1 mol of an Mg atom, and maintained at the same temperature for 2 hours under stirring to effect the reaction. After the completion of the reaction for 2 hours, a solid portion was recovered by hot filtration. This solid portion was resuspended in 100 ml of titanium tetrachloride, and again reacted under heating at 105° C. for 2 hours. After the completion of the reaction, a solid portion was recovered again by hot filtration. The recovered solid portion was sufficiently washed with decane and hexane at 100° C. until a free titanium compound was no longer detected in the washing solution, thus obtaining a solid titanium catalyst component (α29).

(Polymerization)

In the same manner as in Example 1 except that the solid titanium catalyst component (α29) was used, the propylene polymerization was carried out. At this time, the internal pressure of the polymerization vessel was 3.1 MPa (absolute pressure: 3.2 MPa). The results were shown in Table 6.

Example 30

30 ml of the homogeneous solution of magnesium chloride obtained in Example 16 was wholly dropwise introduced under stirring to 80 ml of titanium tetrachloride which was maintained at −20° C. over 45 minutes to obtain a mixed solution. After completion of introduction, the temperature of the mixed solution was elevated to 100° C. over 3.9 hours. When the temperature reached 100° C., diisobutyl cyclohexane-1,2-dicarboxylate (ratio of trans-isomer: 78%) was

TABLE 5

|  | P1*/ MPa | P1/P2* | Ratio of trans-isomer % | Activity kg-PP/g-Cat | MFR g/10 min | Content of decane-insoluble components wt % | Bulk Specific Gravity g/ml | Mw/Mn | Mz/Mw |
|---|---|---|---|---|---|---|---|---|---|
| Ex. 4 | 3.2 | 1.07 | 100 | 29.8 | 4.6 | 97.0 | 0.42 | 6.9 | 4.9 |
| Ex. 22 | 3.2 | 1.07 | 78 | 30.0 | 6.1 | 96.5 | 0.46 | 8.5 | 4.6 |
| Ex. 23 | 3.2 | 1.07 | 55 | 26.4 | 6.6 | 96.0 | 0.40 | 8.9 | 4.6 |
| Ex. 24 | 3.2 | 1.07 | 0 | 18.6 | 14.0 | 93.2 | 0.45 | 7.0 | 4.3 |
| Ex. 25 | 3.2 | 1.07 | 100 | 35.1 | 4.0 | 97.6 | 0.44 | 7.2 | 4.9 |
| Ex. 26 | 3.2 | 1.07 | 78 | 34.6 | 4.0 | 97.4 | 0.47 | 8.1 | 5.2 |
| Ex. 27 | 3.2 | 1.07 | 55 | 30.8 | 4.3 | 96.8 | 0.40 | 8.3 | 5.1 |
| Ex. 28 | 3.2 | 1.07 | 0 | 21.2 | 12.8 | 94.2 | 0.44 | 6.9 | 4.3 |

*P1: Internal pressure of the polymerization vessel at 70° C., P2: Saturation vapor pressure of propylene at 70° C. (3.0 MPa)

added to the mixed solution in a proportion of 0.25 mol-fold relative to 1 mol of an Mg atom, and maintained at the same temperature for 2 hours under stirring to effect the reaction. After the completion of the reaction for 2 hours, a solid portion was recovered by hot filtration. This solid portion was resuspended in 100 ml of titanium tetrachloride, and again reacted under heating at 100° C. for 2 hours. After the completion of the reaction, a solid portion was recovered again by hot filtration. The recovered solid portion was sufficiently washed with decane and hexane at 100° C. until a free titanium compound was no longer detected in the washing solution, thus obtain a solid titanium catalyst component (α30).

(Polymerization)

In the same manner as in Example 1 except that the solid titanium catalyst component (α30) was used, the propylene polymerization was carried out. At this time, the internal pressure of the polymerization vessel was 3.1 MPa (absolute pressure: 3.2 MPa). The results were shown in Table 6.

Example 31

Polymerization

In the same manner as in Example 1 except that the solid titanium catalyst component (α16) obtained in Example 16 was used, the propylene polymerization was carried out. At this time, the internal pressure of the polymerization vessel was 3.1 MPa (absolute pressure: 3.2 MPa). The results were shown in Table 6.

stop the reaction, and propylene was purged. The obtained polymer particles were dried under reduced pressure overnight at 80° C.

The activity of the catalyst, and the MFR, the content of the decane-insoluble components, the bulk specific gravity, and the molecular weight distribution (Mw/Mn, Mz/Mw), the melting point (Tm) and the crystallization temperature (Tc) of the obtained polymer were shown in Table 7.

Comparative Example 7

Production of Solid Titanium Catalyst Component (β7)

First, in the same manner as in Example 1, 2.8 mol of ethanol was coordinated to 1 mol of magnesium chloride to obtain a solid adduct.

46.2 mmol of the solid adduct, in terms of magnesium atom, which was suspended in 30 ml of decane was wholly introduced under stirring to 200 ml of titanium tetrachloride which was maintained at −20° C. to obtain a mixed solution. The temperature of the mixed solution was elevated to 80° C. over 5 hours. When the temperature reached 80° C., diisobutyl phthalate was added thereto in a proportion of 0.135 mol, based on 1 mol of magnesium atom in the solid adduct, and the temperature thereof was maintained at 80° C. for 30 minutes. Then, 2-isobutyl-2-isopropyl-1,3-dimethoxysilane was added thereto in a proportion of 0.15 mol, based on 1 mol

TABLE 6

|  | P1*/ MPa | P1/P2* | Catalyst synthesis temperature/ ° C. | Activity kg-PP/g-Cat | MFR g/10 min | Content of decane-insoluble components wt % | Bulk Specific Gravity g/ml | Mw/Mn | Mz/Mw |
|---|---|---|---|---|---|---|---|---|---|
| Ex. 4 | 3.2 | 1.07 | 110 | 20.4 | 4.0 | 97.2 | 0.42 | 8.2 | 6.2 |
| Ex. 29 | 3.2 | 1.07 | 105 | 26.3 | 4.3 | 97.6 | 0.46 | 7.6 | 4.8 |
| Ex. 30 | 3.2 | 1.07 | 100 | 26.4 | 5.9 | 97.6 | 0.41 | 7.7 | 4.6 |
| Ex. 31 | 3.2 | 1.07 | 97.5 | 24.4 | 4.0 | 98.3 | 0.44 | 7.6 | 4.5 |

*P1: Internal pressure of the polymerization vessel at 70° C., P2: Saturation vapor pressure of propylene at 70° C. (3.0 MPa)

From the results, it is found that by producing the solid titanium catalyst component of the invention at a temperature of 105° C. or lower, the broad molecular weight distribution of the obtained polymer can be highly compatibilized with the activity of the catalyst and the high stereoregularity of the obtained polymer.

Example 32

Polymerization

To a polymerization vessel with an internal volume of 2 liters, 400 g of propylene, 2.3 NL of ethylene, and 1 NL of hydrogen were added at room temperature, and then 0.5 mmol of triethylaluminum, 0.15 mmol of dicyclopentyldimethoxysilane and 0.002 mmol, in terms of titanium atom, of the solid titanium catalyst component (α16) prepared in Example 16 were added thereto, and the internal temperature of the polymerization vessel was rapidly elevated to 70° C. At this time, the internal pressure of the polymerization vessel was 3.0 MPa (gauge pressure) (absolute pressure: 3.1 MPa). After polymerization at 70° C. for 30 minutes, a small amount of methanol was added thereto to of magnesium atom in the solid adduct. Then, the temperature was elevated to 120° C. over 40 minutes, and then maintained at 120° C. under stirring for 90 minutes to effect the reaction.

After the completion of the reaction for 90 minutes, a solid portion was recovered by hot filtration. This solid portion was resuspended in 200 ml of titanium tetrachloride, and the temperature thereof was elevated to 130° C., and then maintained at 130° C. under stirring for 45 minutes to effect reaction. After the completion of the reaction for 45 minutes, a solid portion was recovered again by hot filtration. The recovered solid portion was sufficiently washed with decane and heptane at 100° C. until a free titanium compound was no longer detected in the washing solution, thus obtaining a solid titanium catalyst component (β7).

(Polymerization)

In the same manner as in Example 32 except that the solid titanium catalyst component (β7) was used, the propylene polymerization was carried out. The results were shown in Table 7.

TABLE 7

| | P1*/ MPa | P1/P2* | Activity kg-PP/g-Cat | MFR g/10 min | Content of decane-insoluble components wt % | Bulk Specific gravity g/ml | Mw/Mn | Mz/Mw | Tm/ °C. | Tc/ °C. |
|---|---|---|---|---|---|---|---|---|---|---|
| Ex. 32 | 3.0 | 1.0 | 23.1 | 4.0 | 94.5 | 0.43 | 8.2 | 4.7 | 145.5 | 100.1 |
| Comp. Ex. 7 | 3.0 | 1.0 | 37.9 | 6.8 | 94.4 | 0.43 | 5.6 | 4.0 | 145.5 | 100.4 |

*P1: Internal pressure of the polymerization vessel at 70° C., P2: Saturation vapor pressure of propylene at 70° C. (3.0 MPa)

Example 33

Polymerization

To a polymerization vessel with an internal volume of 2 liters, 650 ml of purified hexane, 175 ml of 1-butene, and 1 NL of hydrogen were added at room temperature, and then 0.6 mmol of triethylaluminum, 0.02 mmol of dicyclopentyldimethoxysilane and 0.015 mmol, in terms of titanium atom, of the solid catalyst component (α16) prepared in Example 16 were added thereto, and the internal temperature of the polymerization vessel was rapidly elevated to 60° C. At this time, the internal pressure of the polymerization vessel was 0.4 MPa (gauge pressure) (absolute pressure: 0.5 MPa). After polymerization at 60° C. for 15 minutes, a small amount of methanol was added thereto to stop the reaction, and an unreacted 1-butene was purged. The solution of the polymer thus obtained was put to a mixed solution of a large amount of methanol and acetone in a ratio by volume of 1:1 to precipitate the polymer and to separate by filtration. The thus obtained polymer was dried under reduced pressure overnight at 80° C.

The activity of the catalyst, and [η], the bulk specific gravity, and the molecular weight distribution (Mw/Mn, Mz/Mw) of the obtained polymer were shown in Table 8.

Further, the saturation vapor pressure of 1-butene at 60° C. is 0.8 MPa.

Comparative Example 8

Production of Solid Titanium Catalyst Component (β8)

In the same manner as in Example 16 except that diisobutyl phthalate was used in a proportion of 0.15 mol relative to 1 mol of magnesium in the magnesium chloride solution, instead of diisobutyl cyclohexane-1,2-dicarboxylate (ratio of trans-isomer: 75%), a solid titanium catalyst component (β8) was obtained.

(Polymerization)

In the same manner as in Example 33 except that the solid titanium catalyst component (β8) was used instead of the solid titanium catalyst component (α16), the 1-butene polymerization was carried out. The results were shown in Table 8.

TABLE 8

| | P1*/ MPa | P1/P2* | Activity/ mmol Ti | [η]/ dl/g | Mw/Mn | Mz/Mw |
|---|---|---|---|---|---|---|
| Ex. 33 | 0.5 | 0.63 | 4.1 | 1.6 | 8.2 | 4.7 |
| Comp. Ex. 8 | 0.5 | 0.63 | 4.1 | 1.7 | 5.6 | 4.0 |

*P1: Internal pressure of the polymerization vessel at 60° C., P2: Saturation vapor pressure of 1-butene at 60° C. (0.8 MPa)

Example 34

Polymerization

To a polymerization vessel with an internal volume of 1 liter, 4-methyl-1-pentene (boiling point at a normal pressure: 54° C.) and 0.5 NL of hydrogen were added at room temperature, and then 0.8 mmol of triethylaluminum, 0.08 mmol of cyclohexylmethyldimethoxysilane and 0.0075 mmol, in terms of titanium atom, of the solid titanium catalyst component (α16) prepared in Example 16 were added thereto, and the internal temperature of the polymerization vessel was rapidly elevated to 50° C. At this time, the internal pressure of the polymerization vessel was 0.1 MPa (gauge pressure) (absolute pressure: 0.2 MPa). After polymerization at 50° C. for 1 hour, a small amount of methanol was added thereto to stop the reaction. The thus obtained slurry was separated by filtration to obtain a white solid, which was dried under reduced pressure overnight at 80° C. The weight of the white solid after drying under reduced pressure was 56.8 g.

The activity of the catalyst, and the MFR, the bulk specific gravity, and the molecular weight distribution (Mw/Mn, Mz/Mw) of the obtained polymer were shown in Table 9.

Comparative Example 9

Polymerization

In the same manner as in Example 34 except that the solid titanium catalyst component (β8) was used, the 4-methyl-1-pentene polymerization was carried out. The results were shown in Table 9.

TABLE 9

| | P1*/ MPa | P1/P2* | Activity/ mmol Ti | MFR/ g/10 min | Mw/Mn | Mz/Mw |
|---|---|---|---|---|---|---|
| Ex. 34 | 0.2 | >1 | 8.0 | 30.0 | 7.5 | 4.8 |
| Comp. Ex. 9 | 0.2 | >1 | 5.5 | 44.0 | 6.0 | 4.0 |

*P1: Internal pressure of the polymerization vessel at 50° C., P2: Saturation vapor pressure of 4-methyl-1-pentene at 50° C.

As shown in Tables 7 to 9, when the process for polymerizing an olefin of the invention is used, various olefin polymers or olefin copolymers having broad molecular weight distributions can be obtained.

The results of the melt tension measurements were shown in Table 10. It is found that the PP of Comparative Example 2 has melt tension inferior than that of Example 4.

TABLE 10

| | Melt tension/g Pulling speed/m/min | | | |
|---|---|---|---|---|
| | 15 | 25 | 45 | 75 |
| Ex. 4 | 0.9 | 1 | 0.9 | 1.0 |
| Comp. Ex. 2 | 0.9 | 0.7 | Thread cut | Thread cut |

The PP of Comparative Example 2 exhibits, for Mw/Mn value, a broad molecular weight distribution equivalent to that of the PP of Example, but exhibits an Mz/Mw value lower than that of the PP of Example 4. This shows that the Mz/Mw value significantly affects the physical properties of the PP than the Mw/Mn value does.

FIG. 1 show a GPC chromatogram of the polypropylene obtained in Example 4, Comparative Example 1 and Comparative Example 2, each of which shows almost the same MFR value. The PP of Example 4 clearly shows molecular weight distribution broader than that of the PP of Comparative Example 1. On the other hand, when comparing the PP's of Example 4 and Comparative Example 2, the PP of Example 4 clearly has lower content of low molecular weight components. This is the reason for the difference in the Mz/Mw values.

As such, the solid titanium catalyst component and the process for producing an olefin polymer according the invention are superior to those of the prior art, since a polymer having a broad molecular weight distribution as defined by not only an Mw/Mn value but also, in particular, an Mz/Mw value, that is, a polymer having a higher ratio of the high molecular weight components and a lower ratio of the low molecular weight components (generally referred to as "Beta" components (sticky components)) can be obtained.

The invention claimed is:

1. A process for producing an olefin polymer, comprising polymerizing an olefin having 3 or more carbon atoms in the presence of a catalyst for olefin polymerization comprising a solid titanium catalyst component (I) which comprises titanium, magnesium, halogen, and a cyclic ester compound (a) specified by the following formula (1):

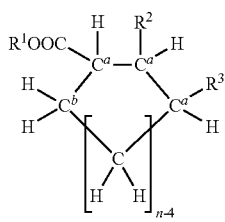

(1)

wherein n is an integer of 5 to 10,
R$^2$ and R$^3$ are each independently COOR$^1$ or a hydrogen atom, and at least one of R$^2$ and R$^3$ is COOR$^1$; and R$^1$'s are each independently a monovalent hydrocarbon group having 1 to 20 carbon atoms, and
a single bond (excluding C$^a$—C$^a$ bonds, and a C$^a$—C$^b$ bond in the case where R$^3$ is a hydrogen atom) in the cyclic backbone may be replaced with a double bond, and
an organometallic compound catalyst component (II) which comprises a metal element selected from Groups I, II and XIII of the periodic table,
at an internal pressure of the polymerization vessel which is 0.4 times or more as high as the saturation vapor pressure of the olefin at a polymerization temperature.

2. The process for producing an olefin polymer according to claim 1, wherein the olefin having 3 or more carbon atoms is an olefin having 3 to 6 carbon atoms.

3. The process for producing an olefin polymer according to claim 1, wherein the olefin having 3 or more carbon atoms is propylene, 1-butene or 4-methyl-1-pentene.

4. The process for producing an olefin polymer according to claim 1, wherein an Mw/Mn value as determined by GPC measurement of the olefin polymer is 6 or more.

5. The process for producing an olefin polymer according to claim 1, wherein in the formula (1), the bonds between the carbon atoms in the cyclic backbone are all single bonds.

6. A solid titanium catalyst component (I-1), comprising titanium, magnesium, halogen, and a cyclic ester compound (a-1) specified by the following formula (2):

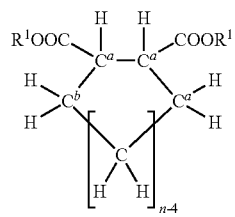

(2)

wherein n is an integer of 5 to 10;
a single bond (excluding C$^a$—C$^a$ bonds and a C$^a$—C$^b$ bond) in the cyclic backbone may be replaced with a double bond;
R$^1$'s are each independently a monovalent hydrocarbon group having 1 to 20 carbon atoms; and
the purity of the trans-isomers of the compound represented by the above formula (2) is 51 to 79%.

7. The solid titanium catalyst component (I-1) according to claim 6, wherein the bonds between the carbon atoms of the cyclic backbone of the cyclic ester compound (a-1) are all single bonds.

8. The solid titanium catalyst component (I-1) according to claim 6, wherein the cyclic backbone of the cyclic ester compound (a-1) has 6 carbon atoms.

* * * * *